(12) United States Patent
Suresh et al.

(10) Patent No.: US 12,411,972 B2
(45) Date of Patent: Sep. 9, 2025

(54) RELATIONAL SECURITY TECHNIQUES FOR DATA LAKES

(71) Applicant: Oracle International Corporation, Redwood Shores, CA (US)

(72) Inventors: Arun Suresh, Redmond, WA (US); Bharat Viswanadham, Langley (CA); Sharad Singh, Bangalore (IN); Arvind Rachuri, Bengaluru (IN); Shashikant Banerjee, Bangalore (IN); Laljo John Pullokkaran, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 204 days.

(21) Appl. No.: 18/487,828

(22) Filed: Oct. 16, 2023

(65) Prior Publication Data

US 2025/0124152 A1    Apr. 17, 2025

(51) Int. Cl.
    *G06F 21/62* (2013.01)
(52) U.S. Cl.
    CPC .............. *G06F 21/6218* (2013.01)
(58) Field of Classification Search
    CPC .................................. G06F 21/6218
    See application file for complete search history.

(56) References Cited

U.S. PATENT DOCUMENTS

| | | | |
|---|---|---|---|
| 8,650,657 B1 * | 2/2014 | Shankar | H04L 9/0819 380/278 |
| 9,894,072 B2 * | 2/2018 | Simone | H04L 63/10 |
| 10,866,932 B2 | 12/2020 | Tallamraju et al. | |
| 11,216,581 B1 * | 1/2022 | Arikapudi | G06F 21/31 |
| 11,321,337 B2 | 5/2022 | Nucci et al. | |
| 2006/0085837 A1 | 4/2006 | Pesati et al. | |
| 2023/0403279 A1 * | 12/2023 | Gnanaprakasam | H04L 63/126 |
| 2024/0348577 A1 * | 10/2024 | Sharma | G06F 21/6218 |
| 2024/0371477 A1 * | 11/2024 | Morse | G16H 10/60 |
| 2025/0173267 A1 * | 5/2025 | Zhu | G06F 13/1668 |

FOREIGN PATENT DOCUMENTS

| | | |
|---|---|---|
| CN | 112597218 A | 4/2021 |
| CN | 109525593 B | 2/2022 |

OTHER PUBLICATIONS

Patentability Search Report mailed on Mar. 21, 2023, 17 pages.
(Continued)

*Primary Examiner* — Hany S. Gadalla
(74) *Attorney, Agent, or Firm* — Kilpatrick Townsend & Stockton LLP

(57) ABSTRACT

Systems, devices, and methods are disclosed for enforcing relational database security policies with respect to database components stored in a data lake. The techniques may include receiving, by a data lake security service associated with a data lake, a file system call comprising a uniform resource identifier and a credential. The service may obtain relational database metadata and identify, from the metadata, a relational database component corresponding to the uniform resource identifier of the file system call. A relational security policy corresponding to that component may be obtained and access to a storage location at which the data associated with the relational database component may be authorized (e.g., based on the credential received).

19 Claims, 13 Drawing Sheets

(56) References Cited

OTHER PUBLICATIONS

Secure a Data Lakehouse with Azure Synapse Analytics, Available at: https://learn.microsoft.com/en-us/azure/architecture/example-scenario/analytics/secure-data-lakehouse-synapse, Accessed from Internet on Mar. 21, 2023, pp. 1-16.

Securing, Protecting, and Managing Data, Available online at: https://docs.aws.amazon.com/whitepapers/latest/building-data-lakes/securing-protecting-managing-data.html, Accessed from Internet on Mar. 21, 2023, pp. 1-8.

Snowflake for Data Lakes, Available online at: https://www.snowflake.com/en/data-cloud/workloads/data-lake/, Accessed from Internet on Mar. 21, 2023, 11 pages.

Unity Catalog, Databricks, Available online at: https://www.databricks.com/product/unity-catalog, Accessed from Internet on Mar. 21, 2023, pp. 1-12.

What Is Data Lake Security?, Available at: https://www.okera.com/blogs/what-is-data-lake-security/, Jan. 3, 2022, 12 pages.

Allen, OkeraEnsemble: Understanding the Benefits of Modular Product Offerings, Available online at: https://www.okera.com/blogs/understanding-the-benefits-of-modular-product-offerings/, Dec. 1, 2022, 17 pages.

Kappes et al., Virtualization-Aware Access Control for Multitenant Filesystems, 30th Symposium on Mass Storage Systems and Technologies (MSST), Available Online at: https://citeseerx.ist.psu.edu/document?repid=rep1&type=pdf&doi=3efa32875e6453276b14156fabbf9529ea3d9610, Jun. 2014, 6 pages.

\* cited by examiner

RELATIONAL SECURITY TECHNIQUES FOR DATA LAKES

BACKGROUND

The emergence of data lakes provides a relatively new paradigm in which large amounts of raw data are stored in an open format that various compute engines can read. Often utilized in cloud computing environments, these data lakes provide a storage layer separate from compute resources. At any suitable time, the data may be accessed by any data engine that is configured to read the open format. These attributes of a data lake make data governance difficult as conventional data lakes include primitive and insufficient access controls that fail to provide the desired degree of control granularity. Conventionally, data lakes lack the ability to enforce relational security policies, leaving relational data stored within the data lake unprotected and accessible to unauthorized parties.

BRIEF SUMMARY

In the following description, for the purposes of explanation, specific details are set forth in order to provide a thorough understanding of certain embodiments. However, it will be apparent that various embodiments may be practiced without these specific details. The figures and description are not intended to be restrictive.

Systems, devices, and computer readable media are disclosed, each of which may comprise one or more memories on which instructions corresponding to the methods disclosed herein may be stored. The instructions may be executed by one or more processors of the disclosed systems and devices by virtue of software, firmware, hardware, of a combination of the above to execute the methods disclosed herein. One or more computer programs can be configured to perform particular operations or actions corresponding to the described methods by virtue of including instructions that, when executed by data processing apparatus, cause the apparatus to perform the actions.

Some embodiments include a method. The method may comprise receiving, by a data lake security service associated with a data lake, a file system call comprising a uniform resource identifier and a credential. The method may comprise obtaining, by the data lake security service, relational database metadata corresponding to a plurality of relational database components. The method may comprise identifying, by the data lake security service from the relational database metadata, a relational database component corresponding to the uniform resource identifier of the file system call. The method may comprise obtaining, by the data lake security service, a relational security policy corresponding to the relational database component. The method may comprise authorizing, by the data lake security service, access to a storage location at which data associated with the relational database component is stored. In some embodiments, the access is authorized based at least in part on the credential and the relational security policy corresponding to the relational database component.

In some embodiments, the method may further comprise providing, by the data lake security service (e.g., responsive to the file system call), a pre-authenticated uniform resource locator corresponding to the storage location at which the data associated with the relational database component is stored within the data lake. In some embodiments, the pre-authenticated uniform resource locator enables subsequent access to the data to be granted irrespective of further evaluation of the relational security policy (e.g., without an additional evaluation of the relational security policy).

In some embodiments, the method may further comprise obtaining, by the data lake security service at start up, additional relational database metadata associated with the plurality of relational database components for which corresponding data is stored in the data lake. The method may further comprise obtaining a plurality of pre-authenticated uniform resource locators comprising a respective pre-authenticated uniform resource locator for each relational database component of the plurality of relational database components. The method may comprise storing the plurality of pre-authenticated uniform resource locators for subsequent use.

In some embodiments, the method may comprise updating the plurality of pre-authenticated uniform resource locators based at least in part on a predetermined frequency or schedule.

In some embodiments, the data lake security service is configured to perform operations comprising: 1) identifying, based at least in part on a predefined expiration rule, an expired pre-authenticated uniform resource locator of the plurality of pre-authenticated uniform resource locators, 2) obtaining a new pre-authenticated uniform resource locator associated with the relational database component corresponding to the expired pre-authenticated uniform resource locator, 3) storing the new pre-authenticated uniform resource locator in a cache, and 4) deleting, from the cache the expired pre-authenticated uniform resource locator.

In some embodiments, the method may comprise generating, by the data lake security service, a mapping between the uniform resource identifier, the credential, the relational database component, and the pre-authenticated uniform resource locator. In some embodiments, the mapping is stored in a trie data structure comprising a plurality of nodes, each node being associated with a respective uniform resource identifier.

In some embodiments, a subsequent access request to the data lake is granted based on whether the subsequent access request comprises the pre-authenticated uniform resource locator, irrespective of further relational security policy processing.

In some embodiments, the method may further comprise generating a hash of the pre-authenticated uniform resource locator prior to providing the pre-authenticated uniform resource locator. In some embodiments, the pre-authenticated uniform resource locator provided comprises the hash, and a client library executing at a relational data engine may receive the hash and reconstruct the pre-authenticated uniform resource locator from the hash.

In some embodiments, the method may further comprise authenticating a requestor associated with the file system call with an identity management service based at least in part on the credential.

In some embodiments, the relational database metadata is received from a metadata store service that manages corresponding relational database metadata for a relational database that is stored in the data lake. In some embodiments, the relational security policy is received from a security policy service that manages the relational security policy, and the relational security policy relates to a column level relational database component or a row level relational database component.

In some embodiments, the data lake stores the data associated with the relational database component in an open format.

In some embodiments, the file system call is received from a client library of a client device. The client library may intercept the file system call from a relational database engine configured to access the data lake and transmit the file system call to the data lake security service.

In some embodiments, the pre-authenticated uniform resource locator is provided to the client library. The client library may transmit to a data lake manager associated with the data lake, a request to access the data associated with the relational database component, the request may comprise the pre-authenticated uniform resource locator.

A non-transitory computer readable medium is disclosed. The non-transitory computer readable medium storing computer-executable instructions that, when executed by one or more processors of a computing device, cause the computing device to perform the methods described herein.

Another example method may comprise transmitting (e.g., by a client library), to a data lake security service, a file system call comprising a uniform resource identifier and a credential, the data lake security service being configured to: 1) identify a relational database component stored within a data lake and corresponding to the file system call and 2) authorize access to the relational database component based at least in part on relational security policy and the credential. The method may further comprise receiving, from the data lake security service, a pre-authenticated uniform resource locator corresponding to the relational database component stored within the data lake. The method may further comprise transmitting, to a data lake manager of the data lake, a request for data corresponding to the relational database component, the request comprising the pre-authenticated uniform resource locator, the data lake manager being configured to restrict access to the data lake in accordance with a plurality of relational security policies corresponding to respective relational database components. The method may further comprise, responsive to the request, receiving, from the data lake manager, the data corresponding to the relational database component stored within the data lake.

In some embodiments, the file system call is initiated by a relational database engine executed at the computing device and intercepted by a client library executing at the computing device, the client library causing the files system call to be transmitted to the data lake security service.

In some embodiments, executing the computer-executable instructions further causes the computing device to store an association between the uniform resource identifier and the pre-authenticated uniform resource locator corresponding to the relational database component in a cache for subsequent access requests. Executing the computer-executable instructions may further cause the computing device to: 1) receive a subsequent access request comprising the uniform resource identifier and the credential, 2) identify, from the cache, the pre-authenticated uniform resource locator corresponding to the relational database component based on the uniform resource identifier, and 3) transmit, to the data lake manager of the data lake, a second request for the data corresponding to the relational database component, the second request comprising the pre-authenticated uniform resource locator identified from the cache.

DETAILED DESCRIPTION

Figure 1:
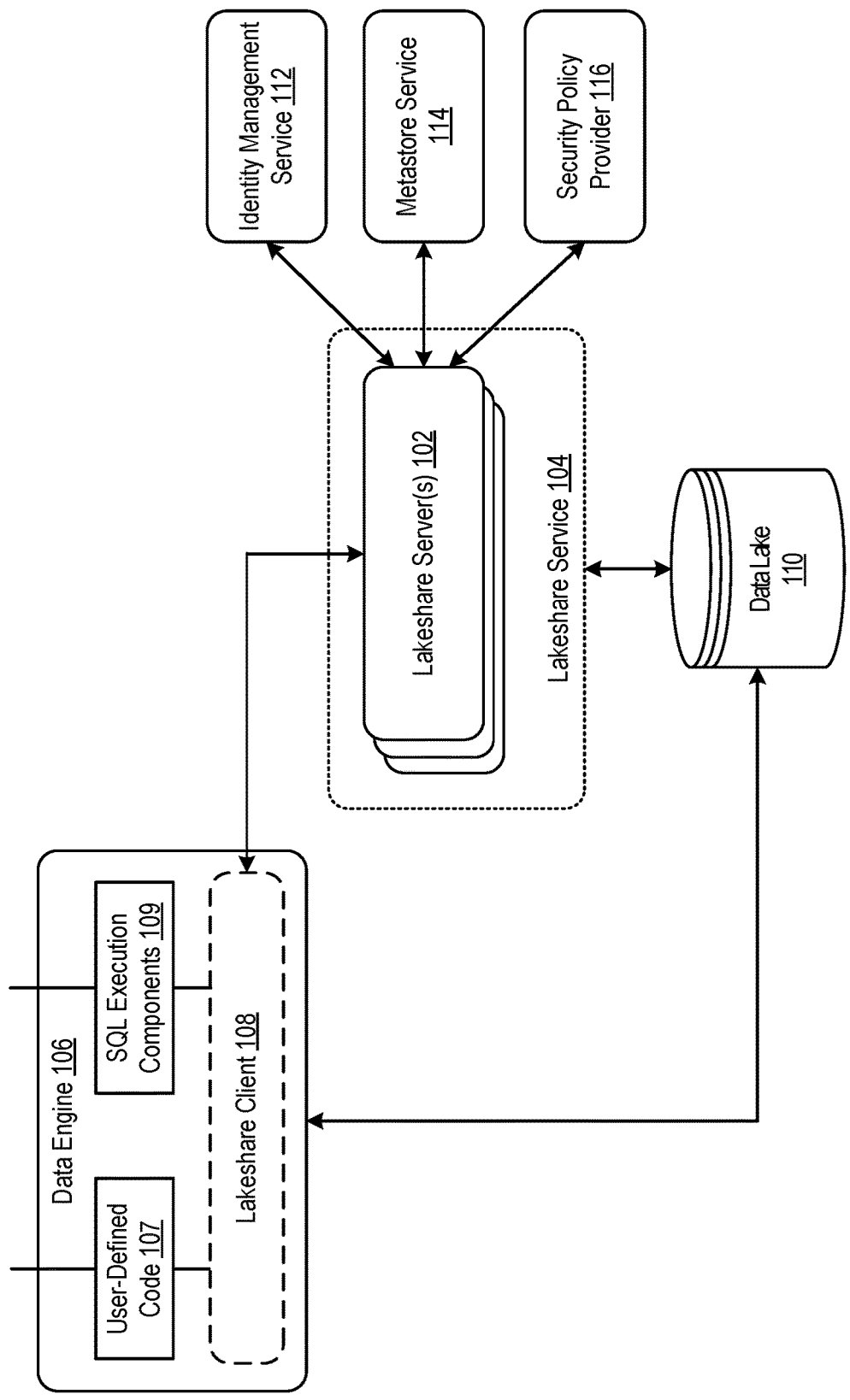
FIG. 1 shows a block diagram of an exemplary system architecture including a Lakeshare Service, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Data warehouses have evolved from expensive proprietary closed systems to open-source data lakes. These data lakes lack centralized data governance to ensure deduplication of redundant data and to enforce data security including enforcing security access policies, data encryption, and audits. The disclosed techniques provide for improvements to data lake security and management. The disclosed architecture and components ("Lakehouse") provide centralized data governance, ACID (e.g., atomicity, consistency, isolation, and durability) transactions, and data mutability to data lakes, ensuring that only one copy of data is stored in object storage buckets and one set of security policies are defined and enforced, regardless of which type of data engine is used to access the data.

Lakehouse enables users to author and enforce role-based access control (RBAC) on data stored in in a data lake (e.g., within Oracle Cloud Infrastructure (OCI) object storage). Data managed by Lakehouse can be accessed by trusted and untrusted data engines. Lakehouse policy enforcement on trusted engines can be achieved by requiring these engines to consult Lakehouse directly. Untrusted data engine may be required to utilize a client library that intercepts read and write filesystem requests to the data lake and diverts them to Lakehouse. Lakeshare servers may identify if the uniform resource locator(s) of the request correspond to data managed by Lakehouse and may apply corresponding relational security policies in the context of the end user, the requested operation, and the resource URL being requested.

Certain Definitions

A "data engine" (also referred to as a "compute engine") refers to a service or application that is configured to access data of a data lake (e.g., data managed by Lakehouse).

A "trusted data engine" refers to OCI built data engines or data engines that are exposed as a service and/or a service or application end users cannot access code running on compute nodes directly. Some examples of trusted data engines include Oracle Autonomous Data Warehouse (ADW) and SQL Endpoint of Dataflow.

An "untrusted data engine" refers to a service for storing, processing, and securing data that allows customer code to be run directly on the compute node. Some of these data engines are based on open-source engines such as Spark, Hive, and Hadoop. Other untrusted data engines may include Big Data Service (BDS) and Dataflow Batch (DFB), among others.

"Data Integration Service" (DIS) refers to a fully managed service that provides extract, transform, and load (ETL) data for data science and analytics.

"Big Data Service" (BDS) refers to a fully automated database service optimized to run transactional, analytical, and batch workloads concurrently for both on-prem and cloud use cases.

"Dataflow Batch" (DFB) refers to a fully managed Apache Spark service that is configured to perform processing tasks on extremely large data sets without infrastructure to deploy or manage.

"Data Catalog Service" (DCAT) refers to a fully managed data catalog service allowing harvest technical metadata from a wide range of supported data sources.

"Lakehouse" refers to a cloud-based data warehouse architecture that combines the advantages of a data lake and a data warehouse with strong data quality, security, and governance for structured, semi-structured and unstructured data.

A "metastore service" refers to a service (e.g., a service built on top of a Hive Metastore (HMS)) that provides relational metadata for data structures like databases, tables, and partitions, including corresponding schemas and locations. This relational metadata allows a client to project schema (e.g., database, table, partition, etc.) onto the real data (e.g., data stored in the data lake/object storage).

An "authorization policy provider" or "security policy provider" (referred to herein as "Ranger") refers to a centralized security framework or service that is configured to manage fine-grained access control over a Big Data ecosystem (Apache Hive, Apache HBase, etc.). Using the functionality provided by a security policy provider, users can easily manage policies around accessing a resource (e.g., a file, a folder, a database, a table, a column, or the like) for a particular set of users and/or groups which are then used to enforce the policies for supported services.

"Role Based Access Control" (RBAC) is based on the concepts of users, roles, groups, and privileges in an organization. With RBAC, administrators grant privileges or permissions to pre-defined organizational roles (e.g., roles that are assigned to principals or users based on their responsibility or area of expertise). RBAC simplifies the administration of data access controls because concepts such as users and roles are well-understood constructs in a majority of organizations.

A "uniform resource identifier," (URI) refers to a string of characters (e.g., a resource identifier) that uniquely identifies a logical or physical resource (e.g., a resource of data lake 110). A URI identifies a resource, by name (e.g., a name/number referred to as a "unique resource name" (URN)), by location, or both. A "uniform resource locator," (URL) refers to a type of URI that includes resource identifier (e.g., a name) and a protocol for locating the resource. A URI may include a URN and, optionally, a protocol for locating the resource corresponding to the URN.

A "pre-authenticated request," (PAR) refers to access data (e.g., a unique URL generated by a data manager) that, when provided to the data manager (e.g., a data manager such an object storage data manager configured to maintain a data lake), causes the data manager to temporarily allow access to read or write files to/from a specific storage location (e.g., a specific bucket, a specific object in a bucket, all object in a bucket that have a specified prefix, etc.). A PAR is not bound to any credentials and/or security policies and may allow access without authentication, irrespective of said credentials and/or security policies. A PAR may be utilized until deleted and/or otherwise expired (e.g., based on an expiration date and/or expiration policy associated with the PAR). A PAR, or some portion of the PAR may be hashed by the generator and the hash value may be digitally signed by the generator using a secret key.

FIG. 1 shows a block diagram of an exemplary system architecture 100 including a Lakeshare server(s) 102, in accordance with at least one embodiment. As depicted, system architecture 100 includes any suitable number of Lakeshare server(s) 102 that are individually deployed as a service. Each of the Lakeshare server(s) 102 may operate as part of a data plane of Lakeshare service 104. Data engine 106 may be any suitable data engine (also referred to as a "compute engine") that is deployed and configured with Lakeshare client 108 for accessing data lake 110. Data lake 110 may be any suitable data lake such as object storage that is configured to store raw data in an open format readable by numerous data engines (e.g., data engine 106) that are configured to utilize the open format. The Lakeshare client 108 may be an extension of the BmcFilesystem, which may be an implementation of a Hadoop Filesystem application programming interface (API).

Data engine 106 may be any suitable data engine that is configured to access data lake 110. Data engine 106 may be configured to execute user-defined code 107 (e.g., any suitable user-defined code for accessing a relational database) and/or structure query language (SQL) execution components 109 (e.g., components that enable SQL queries to be utilized to communicate with a relational database management system). Examples of data engine 106 may include, but are not limited to, like DIS, ADW, DFB, BDS, or the like.

In some embodiments, Lakeshare client 108 may be configured to intercept storage requests (e.g., requests to data lake 110) from data engine 106. The storage request may include a filesystem call (e.g., a uniform resource identifier (URI) provided by a file system such as a Hadoop Distributed File System (HDFS)). The Lakeshare client 108 may be configured to identify whether the filesystem call corresponds to a resource managed by the Lakeshare service 104 (e.g., a resource of data lake 110) and, if so, the Lakeshare client 108 may include a previously stored credential (e.g., a resource principal associated with a user of the data engine 106) with the URI and transmit the combination in a storage request to Lakeshare service 104 for further processing (e.g., via a Hadoop Filesystem API).

One of Lakeshare server(s) 102 may process the request. In some embodiments, Lakeshare server(s) 102 may be configured to authenticate the user and/or data engine 106 via communicating with an identity management service 112. Identity management service 112 may be a cloud-based service (OCI Identity and Access Management (IAM), Oracle Identity Cloud Service (IDCS), etc.) that is configured to provide identity and access management features such as authentication, single sign-on, and identity lifecycle management for a cloud (e.g., Oracle Cloud). Lakeshare server(s) 102 may provide the credential received in the storage request to the identity management service 112. Identity management service 112 may execute any suitable operations for verifying the credential against previously stored credentials according to a predefined authentication scheme.

Lakeshare server(s) 102 may obtain metadata (e.g., relational database metadata) from metastore service 114. Metastore service 114 may be configured to maintain any suitable relational database metadata for database components/structures like databases, tables, and partitions, including corresponding schemas and locations for these components. The metadata obtained from metastore service 114 may be utilized to map the received URI to a relational database component/entity. Once identified, the Lakeshare server(s) 102 may exchange information with the security policy provider 116 to authorize the request. Authorizing the request may include identifying whether the credential is associated with a security policy that allows access to the requested resource.

On successful authorization, the Lakeshare server(s) 102 may obtain a pre-authenticated request (PAR) for the resource and return it to the Lakeshare client 108. The PAR may be a URL (e.g., a unique URL) that is obtained from data lake 110 (e.g., from a data lake manager (not depicted), such as a service configured to manage access to data stored in the data lake 110). In some embodiments, the PAR may be hashed (e.g., using a hashing algorithm) and the resultant hash value may be digitally signed (e.g., using an encryption algorithm with the hash value and key/credential of the data lake manager as input) such that the data lake manager may validate the PAR using the digital signature. Validating the PAR may include determining that the data lake manager generated the PAR and that it is unchanged. By way of example, that data lake manager may utilize its key/credential to obtain the hash from the digital signature. For example, the digital signature and key/credential may be used as input in a decryption algorithm to obtain a hash value. The hash value obtained from the digital signature may be compared with a new hash value recomputed by the data lake manager from the received PAR. If the hash values match, the digital signature may be deemed valid, and processing may continue. If the hash values do not match, the digital signature may be deemed invalid, and the data request may be rejected.

In some embodiments, requests for data of data lake 110 that include a valid PAR (e.g., a PAR that has been previously generated and stored by the data lake manager) may by allowed to access the requested resource for a time. In some embodiments, the PAR may be associated with an expiration date and/or time that, when reached, causes the PAR to be deleted, or otherwise unusable to access the data for which it was generated or any suitable data of the data lake 110.

Figure 5:
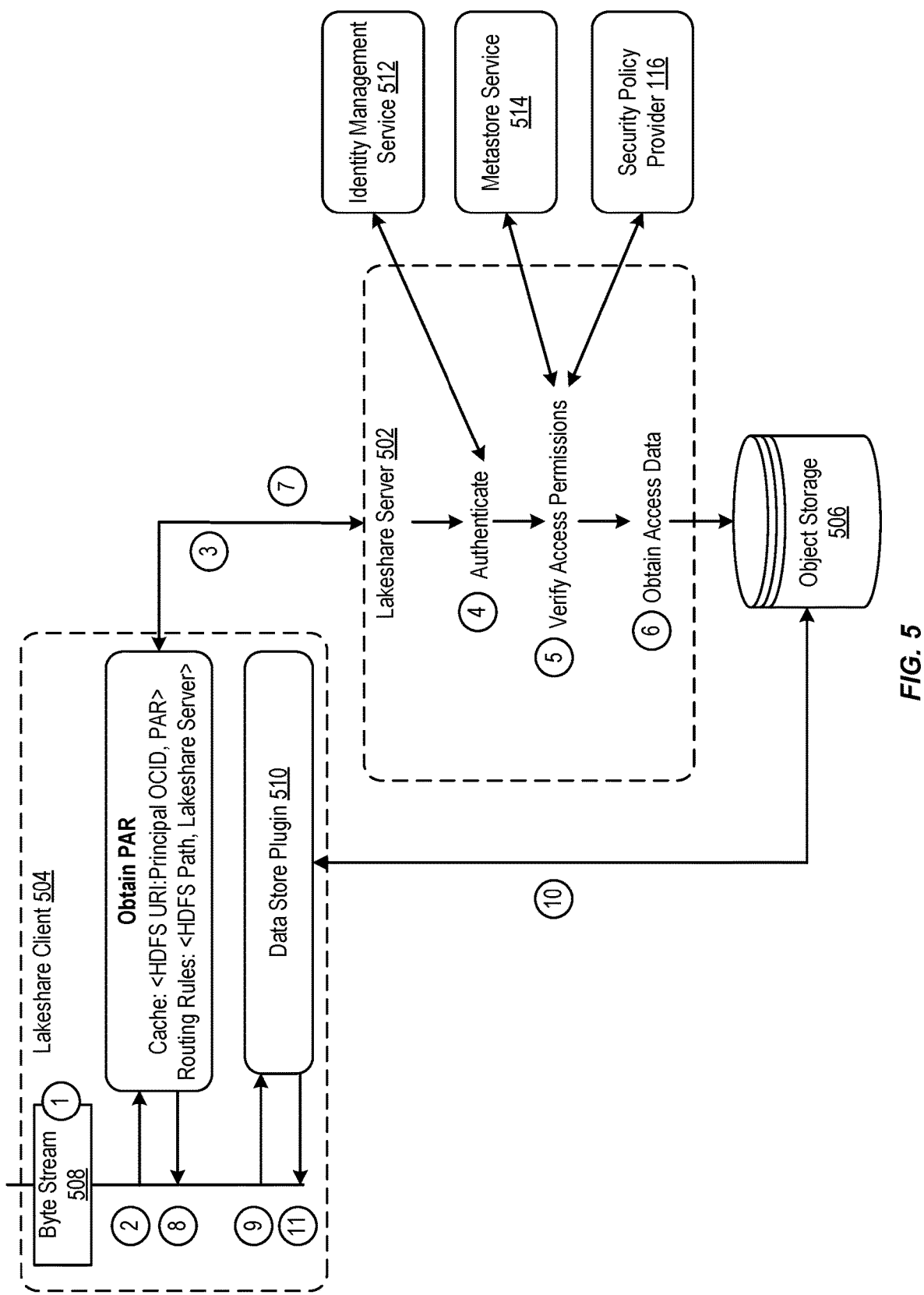
FIG. 5 is a block diagram illustrating exemplary interactions between system components, in accordance with at least one embodiment.

Exemplary interactions between the system components of FIG. 1 is discussed in more detail with respect to FIG. 5.

Figure 2:
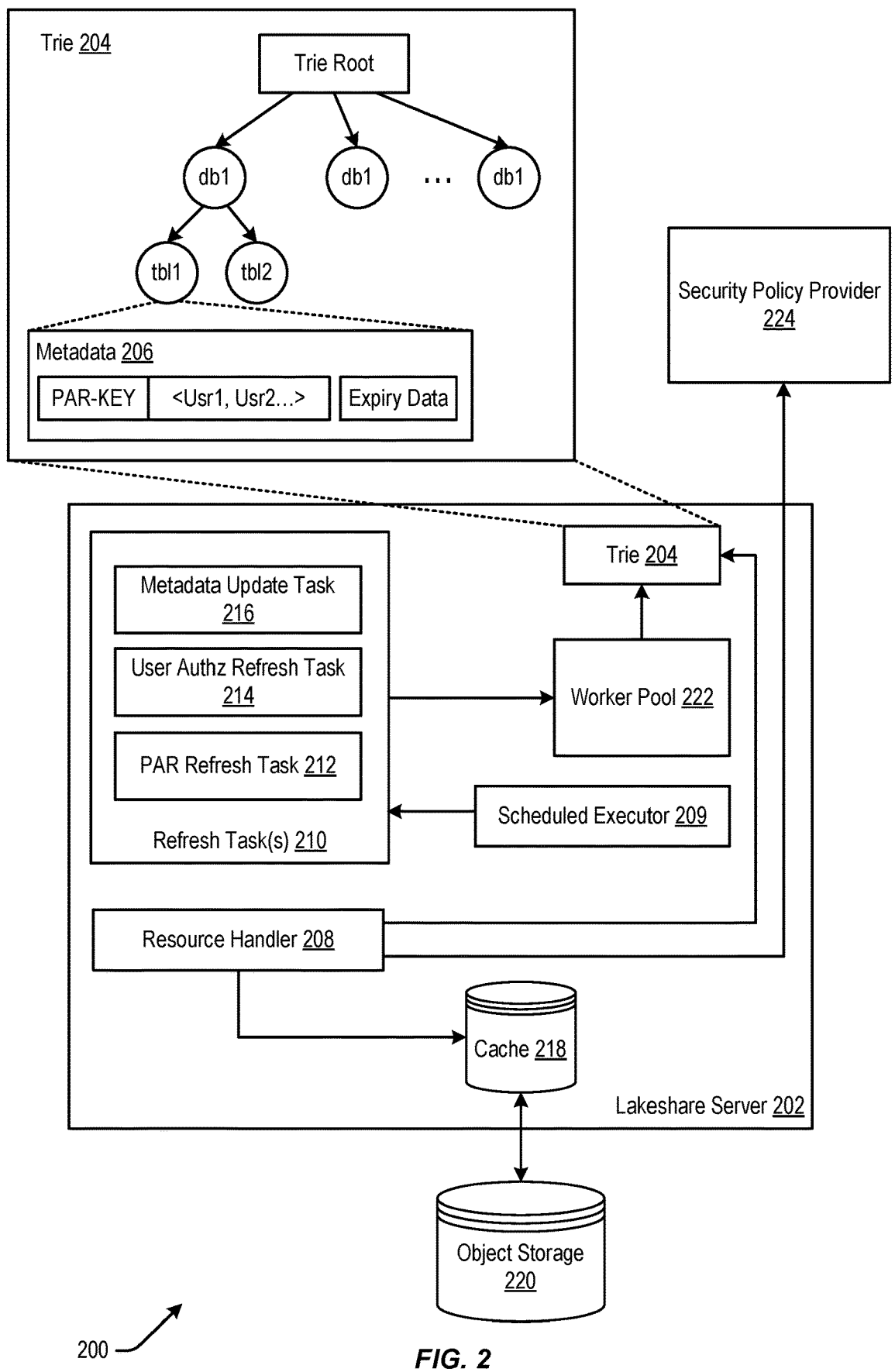
FIG. 2 is a block diagram illustrating components of a Lakeshare Server, in accordance with at least one embodiment.

FIG. 2 is a block diagram 200 illustrating components of a Lakeshare server 202, in accordance with at least one embodiment. Lakeshare server 202 may be an example of the Lakeshare server(s) 102 of FIG. 1. Lakeshare server 202 may store a data structure (e.g., trie 204) that maintains a reverse mapping from a uniform resource identifier (URI) to a relational database component/entity (e.g., a database, a table, a column, etc.). By way of example, trie 204 may be a tree-like data structure with a trie root node and any suitable number of additional nodes. Each of the additional nodes may correspond to a relational databased component/entity such as a database (e.g., "db1"), a table (e.g., "tbl1," "tbl2," etc.). Each node of trie 204 may be associated with metadata (e.g., metadata 206). Metadata 206 may include any suitable data such as a pre-authenticated request (PAR) key (PAR-KEY) that unique identifies a PAR, one or more user identifiers, and any suitable expiry data such as an expiration date/time or other data with which deletion or expiration of the PAR may be assessed. The trie 204 may be updated by the Lakeshare server 202 at any suitable time.

By way of example, scheduled executor 209, a component of the Lakeshare server 202 may be configured to trigger any suitable number and/or combination of refresh task(s) 210 according to a predefined schedule, frequency, periodicity, or according to any suitable trigger. As a non-limiting example, scheduled executor 209 may be configured to cause operations corresponding to PAR refresh task 212, user authz refresh task 214, and/or metadata update task 216 to be executed.

By way of example, scheduled executor 209 may cause operations associated with metadata update task 216 to be executed (e.g., by one or more worker threads of worker pool 222) at any suitable time such as at startup of the Lakeshare server 202. A worker of worker pool 222 may assigned, by the scheduled executor 209, to perform tasks associated with performing the metadata update task 216. The worker may request data from metastore service 114 of FIG. 1 or from any suitable service or location from which relational metadata corresponding to the resources stored within object storage 220 may be obtained. The relational metadata may be processed to identify databases, tables, schemas, locations, and/or any suitable change in any of the above. The trie 204 may be initially generated by processing the relational metadata (e.g., sequentially) to include a hierarchical structure having a trie root at a highest level, and children nodes that correspond to relational components/entities of incrementally finer granularity as the trie 204 is traversed. For example, the trie root may include any suitable number of children nodes that individually represent respective databases. Each node representing a database, may have any suitable number of children nodes representing tables. Each node representing a table, may have any suitable children nodes representing columns and/or rows. Each node representing a column and/or row may include any suitable number of children nodes representing one or more data fields. Once generated, the trie 204 may be updated through periodic executions of the metadata update task 216, as triggered by the scheduled executor 209. Any updates to the relational database components/entities, may be used to update the trie 204 to appropriately reflect these updates such that the trie 204 continues to accurately reflect the relational database components/entities stored within the object storage 220.

At any suitable time (e.g., at start up, periodically, etc.), operations for PAR refresh task 212 may be executed. These operations may include generating one or more PARs for the resources stored within a data lake (e.g., object storage 220, an example of data lake 110 of FIG. 1). These operations may include updating cache 218 with PARs for every resource stored in object storage 220. Cache 218 may be configured to store any suitable number of PARs and information related to each PAR. Each PAR may have a unique identifier (e.g., a PAR-KEY) that was assigned to the PAR by the server that generated the PAR). Information associated with a PAR (and stored in Cache 218) may include any suitable combination of a PAR identifier, a hash value generated from providing the PAR as input to a hashing algorithm, a namespace, and a bucket associated with the PAR.

As part of performing a PAR refresh task 212 during a start-up process, or at any suitable time, scheduled executor 209 may assign a worker of worker pool 222 to update cache 218. The worker may submit a request to object storage 220 for PARs corresponding to every resource stored in object storage 220. The object storage 220 (or a manager/service configured to manage the object storage 220) may generate the requested PARs. The object storage 220 (or manager/service configured to manage the object storage 220) may hash and/or digitally sign each PAR prior to providing them to resource handler 208. Alternatively, the worker may generate the PAR in accordance with the operations discussed below in connection with FIGS. 3 and 4. Each PAR may be associated with expiry data indicating conditions that, if met, cause the PAR to be deleted. The worker may store the PARs in cache 218 according to the expiry data provided. In some embodiments, the scheduled executor 209 may trigger PAR refresh task 212 at any suitable time which may cause a worker to consult the cache 218 to determine whether any previous PARs have expired (based on the corresponding expiry data). If so, the worker may delete the PAR and transmit a new request for the resource corresponding to the newly deleted PAR such that the cache 218 continues to maintain a PAR for every resource within object storage 220. The PARs and/or expiry data may be added at any suitable time to trie 204 as metadata 206 and associated with the node representing the relational component/entity to which they correspond. For example, metadata 206 may be added as part of executing metadata update task 216.

Subsequent data requests may be received (e.g., from data engines of which data engine 106 of FIG. 1 is an example). Resource handler 208 may be configured to receive a data request (e.g., a file system call) that includes a URI and a credential. As discussed above in connection with FIG. 1, the credential may be transmitted to an identity management service (e.g., identity management service 112 of FIG. 1) to authenticate the identity of the user. If the user is authenticated, the resource handler 208 may utilize the URI to traverse the trie 204 via path segments in an attempt to identify a longest prefix match. The relational database component/entity associated with the longest prefix match may be determined. The resource handler 208 may transmit a request to security policy provider 224, an example of security policy provider 116 of FIG. 1, to verify whether the user is authorized to access the identified relational database component/entity. By way of example, the resource handler 208 may provide the user identifier (and/or credential) and the relational database component/entity identified from traversing the trie 204 according to the URI. Security policy provider 224 may identify any suitable security policies associated with the relational database component/entity and determine from those policies, whether access is authorized for the user. The security policy provider 224 may provide a response indicating that the access is authorized or unauthorized. If authorized, the resource handler 208 may consult cache 218 any retrieve the PAR corresponding to the identified relational database component/entity. If a PAR does not exist in the cache 218, the resource handler 208 may be configured to request (e.g., from object storage 220) a PAR for accessing the resource corresponding to the identified relational database component/entity as well as its corresponding expiry data. In some embodiments, the resource handler 208 may be configured to update the trie 204 with the PAR-KEY of the PAR, an identifier of the user, and the expiry data. This metadata may be stored as being associated with a node representing the relational database component/entity to which access was authorized. Resource handler 208 may be configured to transmit the PAR to the requesting device (e.g., data engine 106 of FIG. 1). In some embodiments, the PAR may be hashed, and the resultant hash value may be digitally signed (e.g., with a secret key known to the Lakeshare server 202) prior to transmission.

At any suitable time, the scheduled executor 209 may execute operations for performing user authz refresh task 214. These operations may include assigning a worker to access the metadata stored within trie 204 and sequentially verifying that the users corresponding to the identifiers stored within metadata 206 of the trie 204 (e.g., metadata for any suitable node of the trie 204), are still authorized to access the associated resource. Verifying the users are still authorized for access may include providing, to the security policy provider 224, the user identifier associated with a given user and an identifier for the relational database component/entity corresponding to a given node and receiving a response from the security policy provider 224 indicating that the access is still authorized, or that the access is unauthorized. If unauthorized, the association between the PAR and the user identifier may be deleted or otherwise disassociated with the metadata 206 corresponding to the node representing the resource/relational database component/entity that the user is no longer authorized to access. If authorized, the association may be left unaltered.

Figure 3:
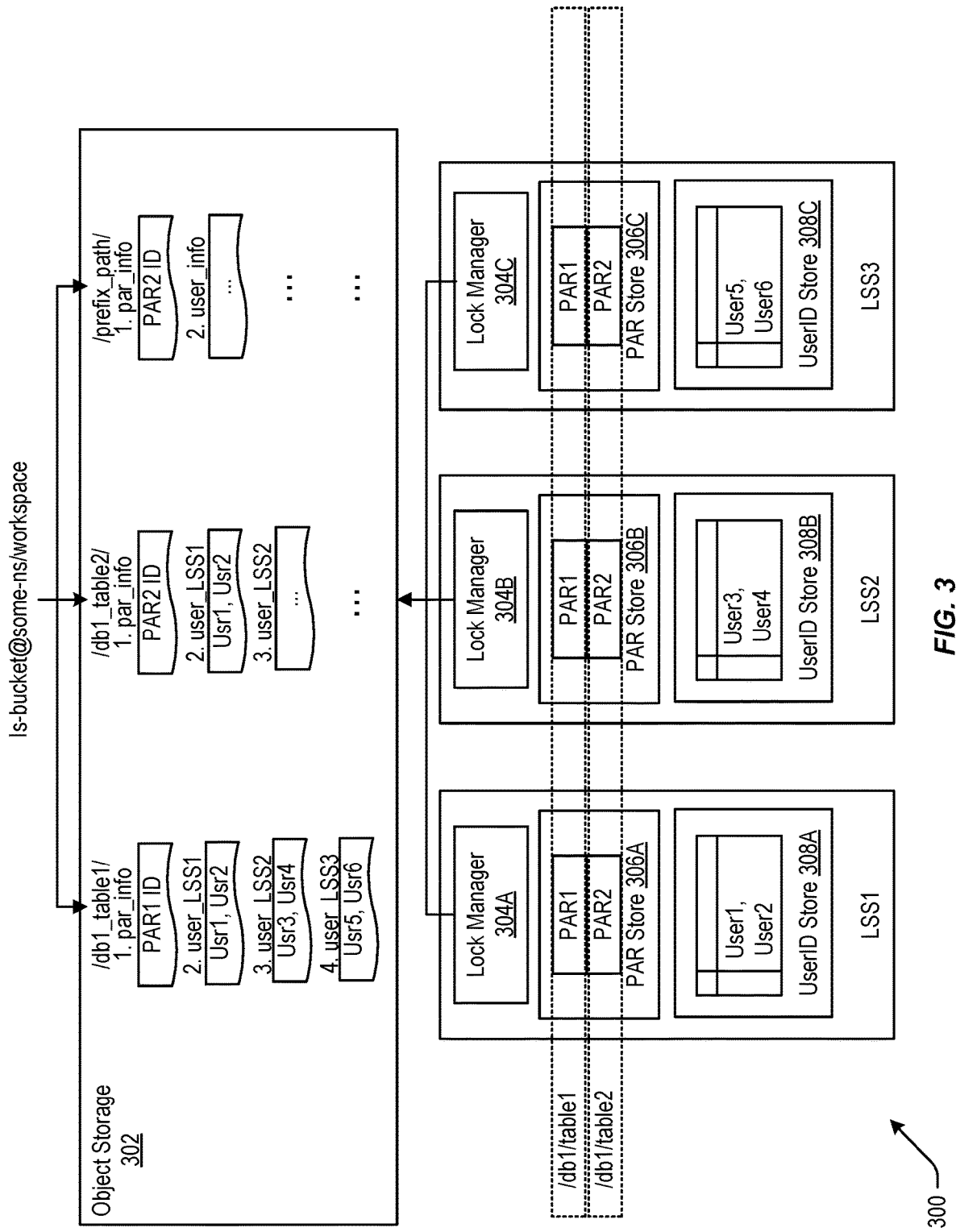
FIG. 3 is a block diagram illustrating exemplary storage layer components (e.g., a number of Lakeshare servers) and operations for managing the creation and persistence of pre-authenticated uniform resource locators (PARs), in accordance with at least one embodiment.

FIG. 3 is a block diagram 300 illustrating exemplary storage layer components (e.g., a number of Lakeshare servers) and operations for managing the creation and persistence of pre-authenticated uniform resource locators (PARs), in accordance with at least one embodiment. The components depicted in FIG. 3 represent a PAR storage layer that provides creation and persistence of PARs. The PARs that are generated may be persisted into a durable store (e.g., object storage 302). This may ensure that in the event of a system crash, it is possible to delete outstanding PARs that are generated-to limit the scope of the PAR leaking and causing inadvertent unauthorized access.

As part of managing the creation and persistent of PARs, the PAR storage layer may ensure that:
1) Any PAR that has been provided to a client will be persisted.
2) Only PARs that have been provided to a user (e.g., via a data engine) are persisted.
3) PAR information includes a PAR identifier, namespace, and bucket. In some embodiments, the PAR ID may be generated by the object storage layer. The PAR identifier may be required to be provided when deleting the PAR prior to automatic expiry.

4) PAR information need not be flushed to disk on creation, allowing the ability to amortize the cost of PAR generation and persistence.

5) PARs are created on Lakeshare server start up.

6) PAR information is initially stored in an in-memory append only structure and backed by ByteBuffer. That PAR deletes are also stored at the end of the buffer. This in-memory buffer may be compacted when the number of PAR deletes have exceeded a threshold.

7) A monotonically increasing PAR-KEY is maintained for all PARs that are generated by the server. The PAR-KEY may be stored as part of metadata 206 of FIG. 2.

8) A last flushed (e.g., persisted to object storage 302) PAR-KEY is maintained for all PARs that are generated by the server.

9) When a request for a PAR arrives at PAR storage, all PARs with PAR-KEY≤the requested PAR-KEY have been flushed to disk before returning the PAR hash as described in connection with FIG. 2.

10) Flushing PAR information is performed as a bulk operation. That is, there is no iteration cost incurred during flush operations as the in-memory buffer may be directly flushed to disk.

Lakeshare servers LSS1, LSS2, and LSS3 represent instances of Lakeshare server(s) 102 of FIG. 1. For the purposes of the example depicted in FIG. 3, /db1/table1 and /db1/table2 are two Lakehouse managed resources. PAR1 and PAR2 are unique pre-authenticated requests generated for resources /db1/table1 and /db1/table2, respectively, and shared by each of the Lakeshare servers. "ls-bucket@some-ns/workspace" is a folder within object storage 302 that is configured for this group of Lakeshare servers. "ls-bucket@some-ns/workspace/db1_table1/par_info" represents a file that contains the PAR identifier (ID) of PAR1 that was created for /db1/table1. Similarly, "ls-bucket@some-ns/workspace/db1_table2/par_info" represents a file that contains the PAR ID of PAR2 that was created for /db1/table2. Each of the user lists under ls-bucket@some-ns/workspace/db1_table1/, such as user_LSS1, user LSS2, and user_LSS3, represent a respective file that contains a respective list of users for which each respective Lakeshare server has served PAR1. Likewise, each of the user lists under ls-bucket@some-ns/workspace/db1_table2/, such as user LSS1 and user LSS2, represent a respective file that contains a respective list of users for which each corresponding Lakeshare server has served PAR2.

In some embodiments, when a respective server starts up, it receives updates from metastore service 114 of FIG. 1. The updates notify each server of all managed prefixes. These updates may be received automatically, or through performance of the metadata update task 216 of FIG. 2. A unique PAR may be generated for each prefix using the following protocol implemented by the lock manager (e.g., lock manager 304A-304C) of each Lakeshare server.

In some embodiments, assuming that LSS1, LSS2, and LSS3 receive updates for /db1/table1 and currently attempt to create the same PAR, each server may be configured to attempt creation of the file 'ls-bucket@some-ns/workspace/db1_table1/par_info' if the file does not yet exist in object storage 302. Only one create operation may succeed. By way of example, LSS1's request to create 'ls-bucket@some-ns/workspace/db1_table1/par_info' may succeed. The server that succeeded creating the file (e.g., LSS1) may proceed to create a PAR (e.g., PAR1) and update the file 'ls-bucket@some-ns/workspace/db1_table1/par_info' with a PAR ID and any suitable information about PAR1. LSS1 may then store PAR1 in its local PAR store 306A. Due to create file operations failing for LSS2 and LSS3, each of these servers may periodically poll the file and wait until the . . . /par_info file is updated. After the file has been updated (e.g., by LSS1), LSS2, and LSS3 may read the file to obtain PAR1 and may each store PAR1 in their respective local PAR stores (e.g., PAR stores 306B and 306C, respectively). A PAR store and userID store (e.g., PAR store 306A and userID store 308A) for a Lakeshare server (e.g., Lakeshare server 202 of FIG. 2) may be part of cache 218 of FIG. 2.

As another example for generating and persisting PARs, all Lakeshare servers (LSS1, LSS2, and LSS3) may first create a separate PAR for /db1/table1. Each server may then attempt to create and write their version of par_info. Only one server (e.g., LSS1) will succeed and the others will fail. At this point, LSS2 and LSS3 may be configured to delete their PAR and may read the par_info file to retrieve PAR1, which may then be stored in respective PAR stores 306B and 306C (e.g., each an example of cache 218 of FIG. 2).

At any suitable time, a Lakeshare server (e.g., LSS1) may receive a request from a client, and if the user (e.g., identified as "user1") associated with the request is authorized to access the resource (e.g., db1/table1) according to the operations described above in connection with FIGS. 1 and 2, the identifier "user1" may be added to the prefix path to userID mapping on that particular server (e.g., within userID store 308A). The identifier "user1" may be further persisted in the server's user list corresponding to the PAR as stored in object storage 302. By way of example, the identifier "user1" may be added to ls-bucket@some-ns/workspace/db1_table1/user_LSS1, corresponding to the list of users for which LSS1 has served PAR1 (the PAR corresponding to the requested resource/db1/table1). In some embodiments, LSS1 may be configured to provide PAR1 to the client only after the user identifier (e.g., "user1") is persisted in its corresponding user list stored within object storage 302.

In some embodiments, each Lakeshare server may periodically iterate over all of the user files in object storage 302 to ensure that knowledge of a user is not restricted to a single server and that server crashes will not lead to PAR leakage.

In some embodiments, if a user's access to a particular resource has been revoked, the PAR associated with that resource may be invalidated and the server may generate a new PAR for that prefix path.

Figure 4:
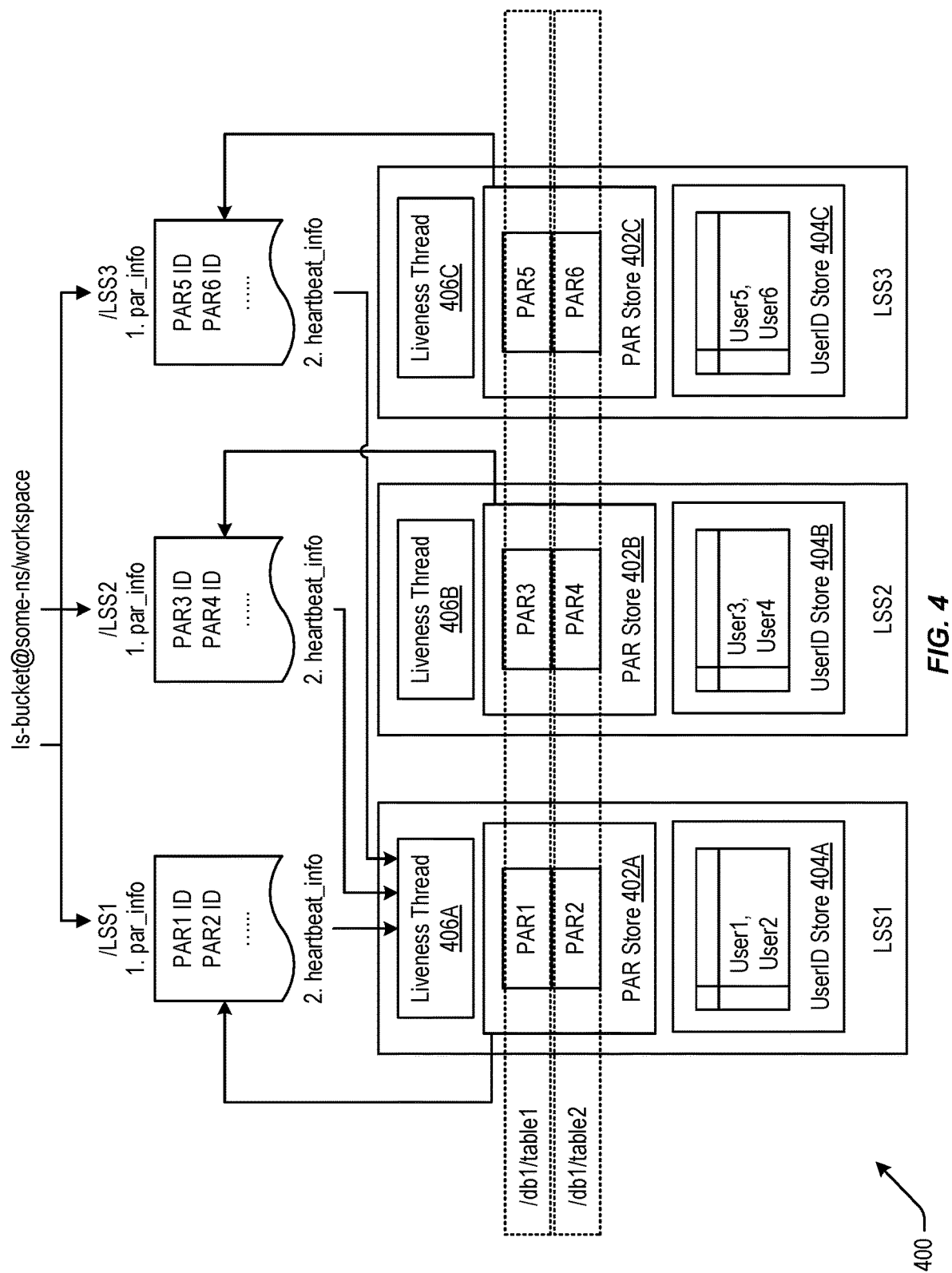
FIG. 4 is a block diagram illustrating another set of operations for managing the creation and persistence of pre-authenticated uniform resource locators (PARs), in accordance with at least one embodiment

FIG. 3 is merely one example of a process for creating and persisting PARs, other embodiments are contemplated. By way of example, FIG. 4 is a block diagram 400 illustrating another set of operations for managing the creation and persistence of pre-authenticated uniform resource locators (PARs), in accordance with at least one embodiment. In the example depicted in FIG. 4, PARs may be persisted in a local in-memory state store at each server. As depicted in FIG. 3, each Lakeshare server in this example may likewise store a PAR store and a userID store (e.g., PAR stores 402A-C and userID stores 404A-C, respectively). A liveness thread (e.g., liveness threads 406A-C) may reside on each server as well. In this use case, the prefix path (e.g., /db1/table1) to PAR mappings may be maintained locally at the Lakeshare server. PAR IDs may be flushed to an object/file in a known folder in object storage (e.g., object storage 220 of FIG. 2, object storage 302, etc.). The folder location may be common and may be passed as a common configuration parameter which is read by each Lakeshare server (e.g., at startup of the server). The file in the folder may be server specific. In some embodiments, a heartbeat information file may also be stored in the folder and may be server specific.

Lakeshare servers LSS1, LSS2, and LSS3 represent instances of Lakeshare server(s) 102 of FIG. 1. For the purposes of the example depicted in FIG. 4, /db1/table1 and /db1/table2 are two Lakehouse managed resources. PAR1 and PAR2 are unique pre-authenticated requests generated for resources /db1/table1 and /db1/table2, respectively, by LSS1. PAR3 and PAR4 are unique pre-authenticated requests generated for resources /db1/table1 and /db1/table2, respectively, by LSS2. PAR5 and PAR6 are unique pre-authenticated requests generated for resources /db1/table1 and /db1/table2, respectively, by LSS3. "ls-bucket@some-ns/workspace" is a folder within object storage data store 402 (e.g., an example of object storage 302 of FIG. 3) that is configured for this group of Lakeshare servers. "ls-bucket@some-ns/workspace/LSS1/par_info" represents a file that contains all of the PAR IDs of the PARs generated by LSS1. " . . . . LSS2/par_info" and " . . . . LSS3/par_info" may likewise represent respective files utilized by LSS2 and LSS3 to store the PAR IDs of the PARs generated by LSS2 and LSS3, respectively. " . . . . LSS1/heartbeat_info", " . . . . LSS2/heartbeat_info", and " . . . . LSS3/heartbeat_info", may individually represent files that each server may create in its workspace folder. Each respective liveness thread on each server (e.g., liveness threads 406A-C) may access or update the file periodically (e.g., every couple of seconds).

In some embodiments, when each server starts up, it receives relational database component/entity updates (e.g., from metastore service 114 of FIG. 1) and is notified of all managed prefixes. Each server may be configured to generate its own PAR for every prefix and may store the PAR ID in its the 'par_info' file. Assuming around 2000 managed prefixes, each PAR ID may be no more than a few bytes. The size of this file may not exceed more than a few megabytes (MB). For example, each file may be smaller than 2 MB. In some embodiments, the server may write out the entire file each time it generates a new PAR. Alternatively, the server may write out a separate file per PAR created and lifecycle policy can be used to delete the file automatically (e.g., in instances where the PAR expires after a time period).

In some embodiments, when the server receives a request from a client (e.g., data engine 106 of FIG. 1, via Lakeshare client 108), and if the user associated with the request is authorized to access the resource, the UserID may be added to the PrefixPath→UserID Mapping on that server (e.g., within cache 218 of FIG. 2). The server (e.g., via performing the user authz refresh task 214 of FIG. 2) may periodically iterate over the PrefixPath→Set<UserID> mapping to verify that the user still has access to the requested resource. If a user's access to a particular resource has been revoked, the PAR associated to the resource may be invalidated and the server may generate a new PAR for that PrefixPath. Clients that had cached the previously invalidated PARs may receive an error and may request a new PAR from the server, which will not be provided to the user whose access was revoked.

Assuming from the example depicted in FIG. 4, that user1 requests permission to read resource/db1/table1. The request may be routed to LSS1 via a load balancer. LSS1 may check its userID store 404A (e.g., cache 218) and may determine that user1 has been authenticated and has been authorized to access the relational database component/entity corresponding to the filesystem call (e.g., URI) provided. The LSS1 may find the PrefixPath associated with the resource/db1/table1, and return the PAR (e.g., PAR1) associated with that resource back the requesting device (e.g., a device running data engine 106 of FIG. 1). In some embodiments, the PAR may be provided as input to a hashing algorithm and a resultant hash may be digitally signed by the LSS1 (e.g., using a secret key known to the LSS1). LSS1 may then add user1 to its userID store 404A (e.g., cache 218). Executing the user authz refresh task 214 of FIG. 2, may cause the server to periodically check to see whether the user continues to have authorization to access that resource.

If LSS1 crashes at some point in time (e.g., "T1"), no other server knows of PAR1. Since the UserID Store is local in-memory state, all knowledge of User1 may be lost since neither LSS2 nor LSS3 knows of user1. Now assume that permission for user1 to access '/db1/table1' had been revoked. Since LSS1 has crashed and restarted, it has no knowledge of user1 and may not poll the security policy provider about this user. The permission revocation can be missed and PAR1 may be still considered valid. This may cause user1 to be able to access a resource using PAR1, since PAR1 was never invalidated. To ward against this error, LSS2 and LSS3 may be notified that LSS1 crashed and one or both of those servers may read LSS1's par_info file and invalidate all of the PARs listed (e.g., all PARs generated by LSS1).

To detect a crash, each Lakeshare server may start up a liveness thread (e.g., liveness threads 406A-C). Periodically, the liveness thread may be configured to update the server's corresponding heartbeat_info file (e.g., by updating a timestamp stored within the file). Each server may be configured to monitor its peer servers. If a server detects that a peer server has not updated its heartbeat_info file in a threshold period of time (as determined by comparing a current time to the timestamp stored within the heartbeat_info file), or it as missed a threshold number of heartbeat, the peer server may be deemed to have crashed and the server that detects this condition may delete all PARs it finds in the crashed server's par_info file.

FIG. 5 is a block diagram illustrating exemplary interactions between system components, in accordance with at least one embodiment. A method 500 may be implemented by and Lakeshare server 502 (an example of one of Lakeshare server(s) 102 of FIG. 1) and Lakeshare client 504 (an example of Lakeshare client 108 of FIG. 1). Lakeshare server 502 may operate as part of a regional, native cloud (OCI) service ("Lakeshare service") that may be deployed in a customer enclave (e.g., a customer overlay network). The Lakeshare service may be configured to handle lifecycle management including any suitable combination of creating, provisioning, reading, updating, and deleting a data lake such as object storage 506 (an example of the data lake 110 of FIG. 1), and creating, reading, updating, and/or deleting data lake entities such as databases, tables, columns, or the like. The Lakeshare service may be configured to perform security management operations such as providing APIs and/or user interfaces for defining roles and security policies allowing users to access the data lake and/or resource/entities stored within. As discussed in connection with the figures described above, the Lakeshare service may provide integration management functionality that provides data engines (e.g., data engine 106 of FIG. 1) access to the object storage 506 and its entities with relational database security policies enforced on the filesystem calls initiated by the data engine.

The Lakeshare service (e.g., Lakeshare server 502) may be configured as a proxy service that handles authorization of data access requests according to method 500. Compute engines (e.g., data engine 106) may execute Lakeshare client 504 in lieu of conventional object store clients. As discussed above in connection to FIG. 1, Lakeshare client 504 may send data access requests to Lakeshare service to obtain a pre-authenticated request with which the Lakeshare client 504 may access the resource stored in object storage 506.

The method 500 may begin at step 1, where a byte stream is received by Lakeshare client 504 from the data engine 106 on which Lakeshare client 504 operates. The data engine 106 may translates a request for a relational object to an object store location within object storage 506. Data engine 106 may invoke an object store file system to access a uniform resource identifier (URI) corresponding to the relational object. The call (e.g., byte stream 508) is intercepted by the Lakeshare client 504 at step 1.

At step 2, the Lakeshare client 504, as part of functionality executed to obtain a PAR, may consult locally stored routing rules to identify whether the requested URI is managed by the object storage 506. If it is not, the call may be handled by the conventional object store client (not depicted). If the routing rules identify the URI as being managed by the object storage 506, the Lakeshare client 504 may execute functionality to determine whether a PAR has previously been obtained for the URI. In some embodiments, the Lakeshare client 504 may consult a cache (not depicted). The cache may be stored in-memory of the device on which Lakeshare client 504 operates and may be configured as a key-value store in which a key (e.g., a concatenation of the prefix of the URI and a principal ID (e.g., an Oracle Cloud Identifier (OCID) that uniquely identifies the user)) is utilized as a key, and the value corresponds to a previously obtained PAR. Using the URI prefix obtained at step 1 as a key, the Lakeshare client 504 may identify if a corresponding PAR has previously been cached. If a PAR has already been associated with the key, the Lakeshare client 504 may return the PAR stored in the cache.

Alternatively, if the PAR is not stored in the cache, the Lakeshare client 504 may utilize an application programming interface (API) to request a PAR for the URI at step 3. This may include consulting locally stored routing rules. The request may include the filesystem call URI (e.g., a Hadoop Distributed File System (HDFS) URI) and the principal ID (e.g., an OCID associated with the user). In some embodiments, the principal OCID may be considered a credential associated with the user such as an identity and access management (IAM) principal token associated with the user requesting access to the URI.

The Lakeshare server 502 (e.g., the resource handler 208 of FIG. 2) may receive the request and proceed with authenticating the user at step 4. Authenticating the user may include providing the received credential to the identity management service 512 (an example of the identity management service 112 of FIG. 1). As described above, the identity management service 512 may execute any suitable operations for verifying the identity of the user including, but not limited to, comparing the credential to previously provided credentials. If the provided credential matches a previously provided credential, the identity management service 512 may respond to the request with data indicating that the user has been authenticated and the method may proceed to step 5. Alternatively, if the identity management service 512 does not find a matching credential, the user is not authenticated, and the processing of the user's request may cease. In some embodiments, a response indicating authentication failure may be provided to the Lakeshare client 504 and any suitable indication of this failure may be provided by the Lakeshare client 504 to the data engine, and ultimately presented to the user via a user interface hosted by the data engine.

If the user is authenticated, the Lakeshare server 502 may verify access permissions at step 5. Verifying access permissions may include determining whether the user is authorized to access the requested resource corresponding to the URI.

Figure 6:
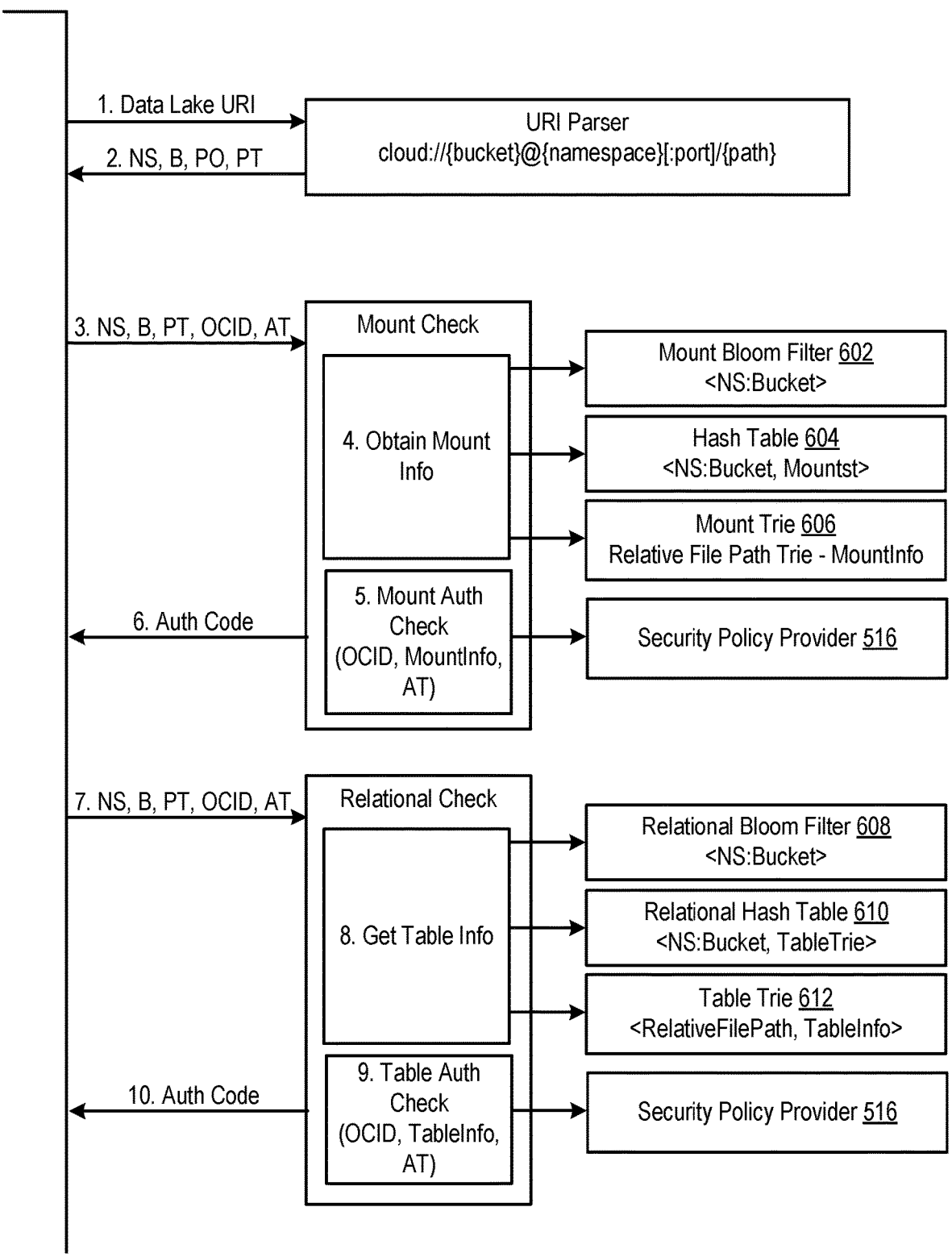
FIG. 6 shows a flow diagram of a method for authorizing an access request, in accordance with at least one embodiment.

FIG. 6 shows a flow diagram of a method 600 for authorizing an access request, in accordance with at least one embodiment. The method 600 may be performed by the Lakeshare server 502 of FIG. 5 (e.g., by an authorization module of the Lakeshare server 502 (not depicted)).

The method 600 may begin at step 1, where the data lake URI (e.g., the URI received from Lakeshare client 504 of FIG. 5) may be provided to a URI parser to identify a namespace (NS), bucket (B), file path (FP), and path tokens (PT), which may be returned at step 2.

At step 3, the namespace (NS), bucket (B), path tokens (PT) (e.g., URI prefix), the user's OCID, and access type (e.g., read, write, etc.) may be used to perform a mount check. A mount check may include identifying whether an entity (e.g., a bucket) has been mounted (e.g., processed by the operating system of the node on which it is stored to make the entity available to users via the node's file system). The process for mounting an entity may include recognizing, reading, and processing the file system structure and metadata of the entity before registering to a virtual file system component. As part of checking the mount (e.g., determining whether the entity is mounted/available), mount information may be obtained at step 4 using predefined data structures such as mount bloom filter 602, a hash table 604, and Mount Trie 606. Mount bloom filter 602 may be a probabilistic data structure that returns an indication of whether input is definitely not in a set (e.g., a set of mounted entities). Using namespace: bucket as input, the mount bloom filter 602 may be used to determine whether the bucket is mounted. If the bucket is not mounted, then it is not available for read/write operations, and the method 600 may cease, potentially after an indication that the bucket is not mounted is returned. In some embodiments, hash table 604 may be utilized to maintain all mounts for each bucket. The hash of the index (in this case namespace: bucket) may return a trie data structure (e.g., mount trie 606) that identifies all mounts in the bucket including the relative paths to mount information. The operations described in connection to step 4 may be performed on each full path in a loop starting the namespace: bucket until all mount information has been obtained.

At step 5, the Lakeshare server may check if the user is authorized to access the identified mount(s). This may include providing the user's credential (e.g., the OCID/resource principal), mount information, and access type to security policy provider 516. Security policy provider 516 may identify whether the user's credential is associated with any previously stored access policies that are associated with the mount information. If these policies allow access to the user to the identified mounts, for the corresponding access type, an authorization code may be returned at step 6 indicating access is authorized. Else, the data may be returned at step 6 indicating the user is not authorized to access the mount(s).

At step 7, the namespace (NS), bucket (B), path tokens (PT) (e.g., URI prefix), the user's OCID, and access type (e.g., read, write, etc.) may be used to perform a relational security check (e.g., to determine whether the user is authorized to access the requested relational database entity). As part of checking relational security, table information may be obtained at step 8 using predefined data structures such as relational bloom filter 608, relational hash table 610, and table trie 612. Relational bloom filter 608 may be a probabilistic data structure that returns an indication of whether input is definitely not in a set (e.g., a set of relational database entities of a relational data model). Using namespace: bucket as input, the relational bloom filter 608 may be used to determine whether the bucket is part of a relational data model. If the bucket is not part of the relational data model, and the method 600 may cease, potentially after an indication that the bucket is not part of a relational data model and, therefore, authorization cannot be determined. If part of the relational data model, the method 600 may proceed. Relational hash table 610 may be utilized to maintain all table information corresponding to each bucket. The hash of the index (in this case namespace: bucket) may return a trie data structure (e.g., table trie 612) that identifies all table information for each table in the bucket including the relative paths to the table information. The operations described in connection to step 8 may be performed on each full path in a loop starting the namespace: bucket until all table information has been obtained.

At step 9, the Lakeshare server may check if the user is authorized to access the identified table(s). This may include providing the user's credential (e.g., the OCID/resource principal), table information, and access type to security policy provider 516. Security policy provider 516 may identify whether the user's credential is associated with any previously stored access policies that are associated with the table(s). If these policies allow access to the user to the identified tables, for the corresponding access type, an authorization code may be returned at step 10 indicating access is authorized. Else, the security policy provider 516 may return data at step 10 indicating the user is not authorized to access the table(s).

Returning to FIG. 5, once the user has been identified as being authorized (e.g., according to the authorization codes provided, by an authorization module of Lakeshare server 502, at step 7 and 10 of FIG. 6), the Lakeshare server 502 may obtain access data at step 6. Obtaining access data may include generating a PAR in the manner described in connection with FIG. 3 or 4. In some embodiments, this may include obtaining a previously generated PAR for the requested resource stored in object storage 506 (e.g., an example of data lake 110 of FIG. 1, object storage 302 of FIG. 3, etc.). The PAR may be cached at Lakeshare server 502 and the PAR and URI prefix is returned to Lakeshare client 504 at step 7. In some embodiments, the PAR may be hashed and/or digitally signed by the Lakeshare server 502 prior to returning it to Lakeshare client 504. The Lakeshare client 504 may cache the PAR (or PAR hash). At step 8, the PAR (or PAR hash) that was previously cached, or the PAR (or PAR hash) obtained from the Lakeshare server 502 via steps 3-7 may be returned at step 8.

At step 9, the Lakeshare client may use the PAR hash (e.g., the PAR hash retrieved from the cache to construct a URI to the resource (e.g., the URI corresponding to the pre-authenticated request) and use the constructed URI to access the resource via the object storage 506. Since the URI is pre-authenticated, the object storage 506 allows the access without authenticating the user or performing any authorization checks for the request. The use of the URI of the PAR is deemed to be pre-authenticated and thus, access is allowed unchallenged.

At step 10, the accessed data is provided to the Lakeshare client 504 and returned to the data engine 106 at step 11.

Figure 7:
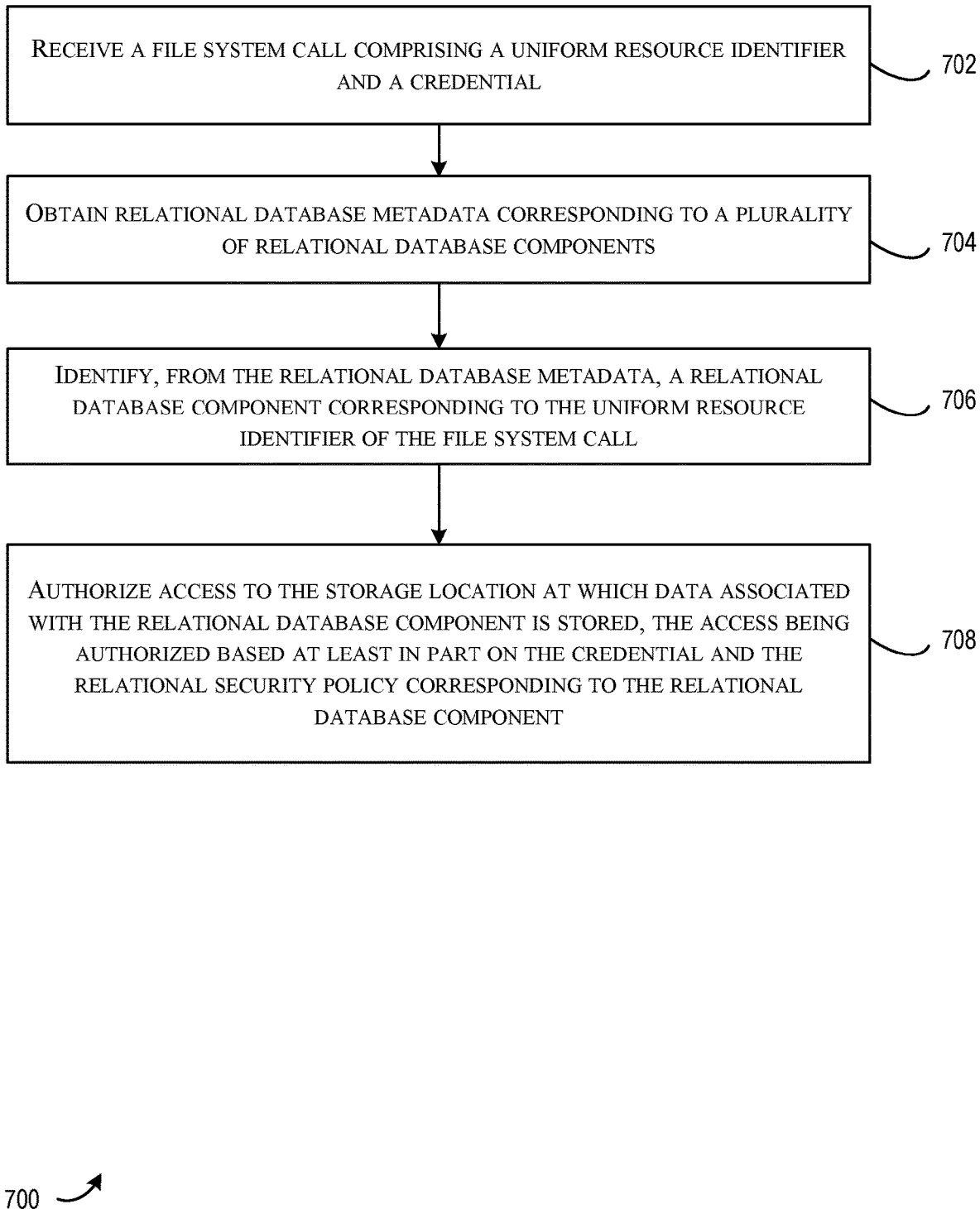
FIG. 7 shows a flow diagram of a method for authorizing access to a storage location at which data associated with a relational database is stored (e.g., within a data lake) according to a relational security policy, in accordance with at least one embodiment.

FIG. 7 shows a flow diagram of a method 700 for authorizing access to a storage location at which data associated with a relational database is stored (e.g., within a data lake) according to a relational security policy, in accordance with at least one embodiment. The method 700 may be performed by the Lakeshare server(s) 102 and/or Lakeshare server 502 of FIGS. 1 and 5, respectively. Although a number of operations are depicted in FIG. 7, method 700 may include more, less, and/or different operations than those depicted. The operations of method 700 may be performed in any suitable order.

The method 700 may begin at 702, where a file system call comprising a uniform resource identifier and a credential is received (e.g., from the Lakeshare client 108 of FIG. 1, operating at data engine 106 of FIG. 1). In some embodiments, the data engine 106 is untrusted (e.g., allowed to execute customer code). The file system call may be associated with a distributed file system (e.g., Hadoop Distribute File System (HDFS)). In some embodiments, the credential comprises a resource principal associated with a user. The resource principal may be issued by an identity management service (e.g., identity management service 112) to uniquely identify the user. The resource principal may be utilized to authenticate the user with the identity management service at any suitable time.

At 704, relational database metadata corresponding to a plurality of relational database components (e.g., databases, tables, columns, rows, fields, etc.) may be obtained. In some embodiments, the relational database metadata may be obtained from metastore service 114 of FIG. 1, metastore service 514 of FIG. 5, etc. In some embodiments, the relational database metadata may be used to generate and/or update any suitable data structure (e.g., trie 204). In some embodiments, the data structures 602-612 of FIG. 6 may be obtained from metastore service 514.

At 706, a relational database component corresponding to the uniform resource identifier (URI) of the file system call may be identified from the relational database metadata. By way of example, the URI may be utilized to traverse the trie 204 to identify a path corresponding to a longest matching prefix. A node corresponding to that path may be associated with a relational database component (e.g., tbl1, corresponding to a table of a relational data model) and the identifier of the relational database component may be obtained.

At 708, access to a storage location at which data associated with the relational database component is stored may be authorized. In some embodiments, the access may be authorized based at least in part on the credential and the relational security policy corresponding to the relational database component. By way of example, the credential may be provided to a security policy provider (e.g., security policy provider 116 of FIG. 1) and/or the policies associated with the relational database component may be obtained. In either case, the credential may be used to evaluate the policies to identify whether the user corresponding to the credential is authorized, according to said policies, to access the requested component. More specific information on this authorization process is discussed in connection with method 600 of FIG. 6.

Figure 8:
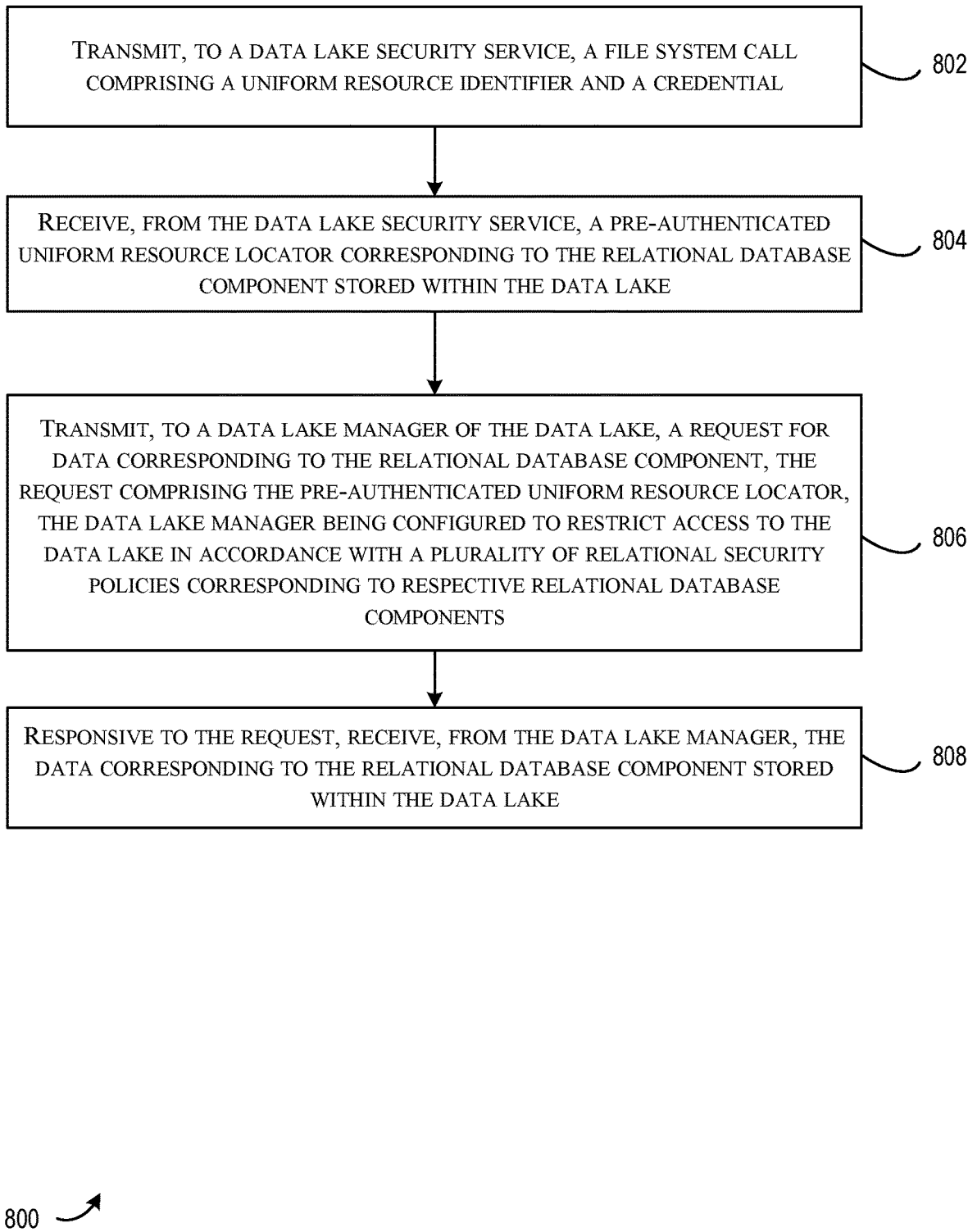
FIG. 8 shows a flow diagram of a method for obtaining access to a storage location at which data associated with a relational database is stored (e.g., within a data lake) according to a relational security policy, in accordance with at least one embodiment.

FIG. 8 shows a flow diagram of a method 800 for obtaining access to a storage location at which data associated with a relational database is stored (e.g., within a data lake) according to a relational security policy, in accordance with at least one embodiment. The method 800 may be performed by the Lakeshare client 108 and/or Lakeshare client 504 of FIGS. 1 and 5, respectively. Although a number of operations are depicted in FIG. 8, method 800 may include more, less, and/or different operations than those depicted. The operations of method 800 may be performed in any suitable order.

At 802, a file system call comprising a uniform resource identifier and a credential may be transmitted to a data lake security service (e.g., Lakeshare service 104, comprising Lakeshare server(s) 102 of FIG. 1). In some embodiments, the data lake security service may be configured to perform a variety of functions including, but not limited to 1) identifying a relational database component stored within a data lake and corresponding to the file system call (e.g., corresponding to the URI of the file system call), and/or 2) authorizing access to the relational database component based at least in part on relational security policy and the credential. In some embodiments, authorizing access to the relational database component may include consulting policies maintained by a security policy provider (e.g., security policy provider 116) based on the credential (e.g., to identify whether the user associated with the credential is authorized to access the relational database component associated with a given security policy).

At 804, a pre-authenticated uniform resource locator (URL) corresponding to the relational database component stored within the data lake may be received from the data lake security service.

At 806, a request for data corresponding to the relational database component may be transmitted to a data lake manager of the data lake (e.g., an object storage service associated with data lake 110 of FIG. 1, object storage 220 and/or 302 of FIGS. 2 and 3, respectively, etc.). In some embodiments, the request comprises the pre-authenticated uniform resource locator. The data lake manager may be configured to restrict access to the data lake in accordance with a plurality of relational security policies corresponding to respective relational database components. This may be achieved through the use of the pre-authenticated URL (referred to herein as a "PAR"). For example, the data lake manager may allow access without performing any authentication of the user and/or authorization processing of the user's request based at least in part on identifying the request comprises the pre-authenticated URL.

At 808, responsive to the request, the data corresponding to the relational database component stored within the data lake may be received from the data lake manager.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
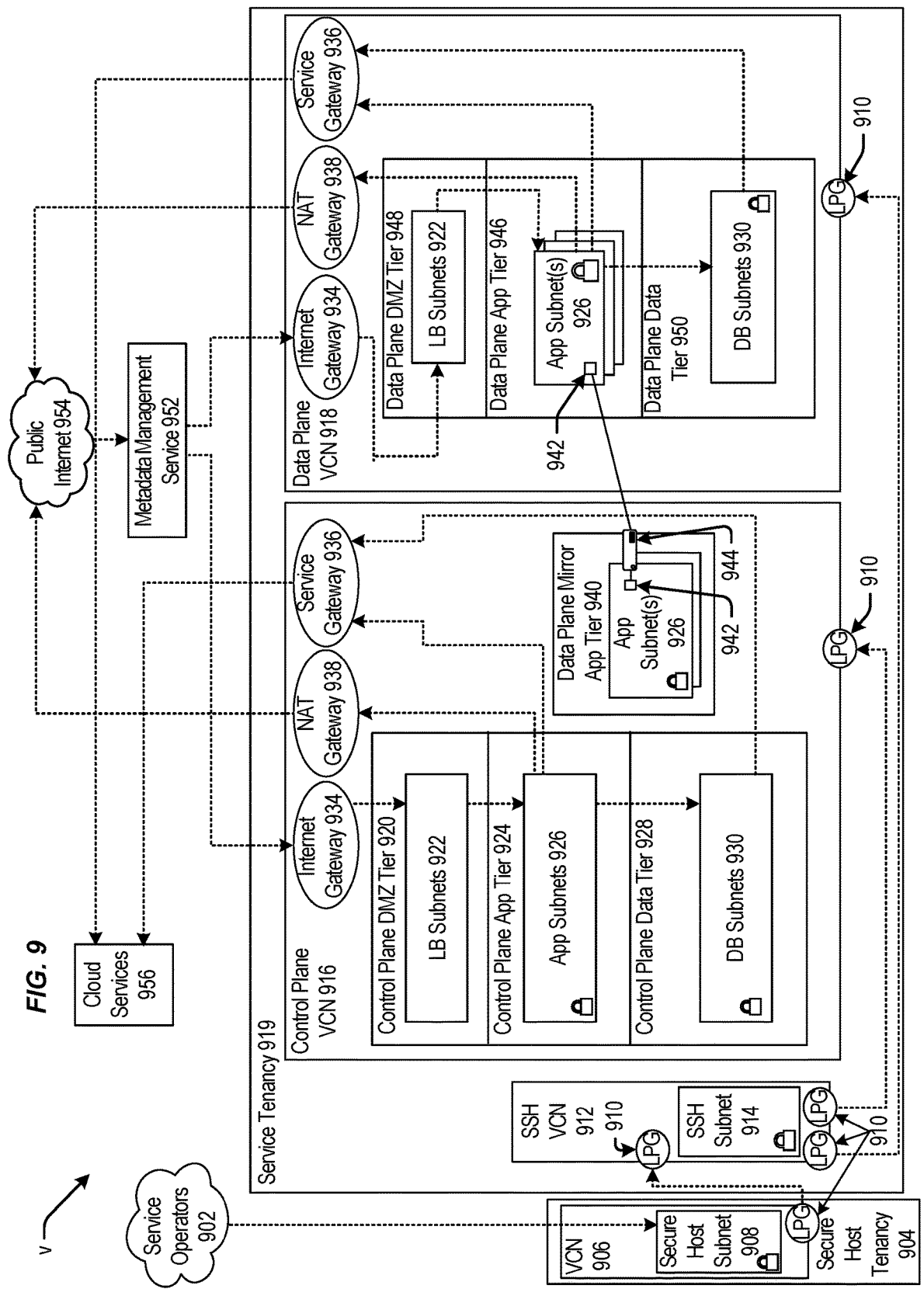
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet. In some embodiments, the computing devices used by operators 1006 may execute any suitable combination of one or more data engines (e.g., data engine 106).

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the control plane DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938. The control plane app tier 924 may host all management functionality of the Lakeshare service 104 of FIG. 1, including RESTful Lakehouse API Server and workflow manager micro-services. These micro-services may be deployed on hosts residing in a private IP subnet. A service principal associated with the service is available at the hosts so that the micro-services can authenticate to cloud services @956.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane app tier 946 may host any suitable number of Lakehouse instances (e.g., instances of Lakeshare server(s) 102 of FIG. 1) and may include any suitable components discussed in connection with FIG. 2. Each Lakehouse deployment may execute the following services in a common namespace dedicated for the Lakehouse instance:

Lakehouse command processor (e.g., within a Kubernetes pod)—a Spark extension called "Lakehouse Command Processor" along with a Spark Thrift Server (STS).
  The Lakehouse command processor may be a long-running instance where end users can submit predefined SQL-based DDL via Control Plane REST endpoints to fetch results.
  The STS may expose a JDBC interface to control plane. STS may reside in a namespace specific to the Lakehouse instance and may not be allowed to communicate with different Lakehouse command processors of different Lakehouse instances (associated with different namespaces).
Security Policy Provider (e.g., within a Kubernetes pod)—a managed policy store supporting fine-grain security for each Lakehouse instance as described in FIGS. 1-6
Lakeshare server—a proxy providing enhanced object storage clients with Lakehouse data access (e.g., to data lake 110 of FIG. 1) under fine-grain authorization corresponding to a relational data model.
Lakehouse Data Plane (DP) Proxy-a DP service that proxies the Security Policy Provider and handles special commands from metastore service.

In some embodiments, although not depicted in FIG. 9, Lakehouse instances may operate as part of a Lakehouse cell. A Lakehouse cell is a grouping of components that work together as a unit of scale and isolation. Each component within a Lakehouse cell may be deployed to a dedicated Kubernetes namespace. Treating a Lakehouse namespace as a logical sub-cell within the Lakehouse cell provides a second level of isolation.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Metadata that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
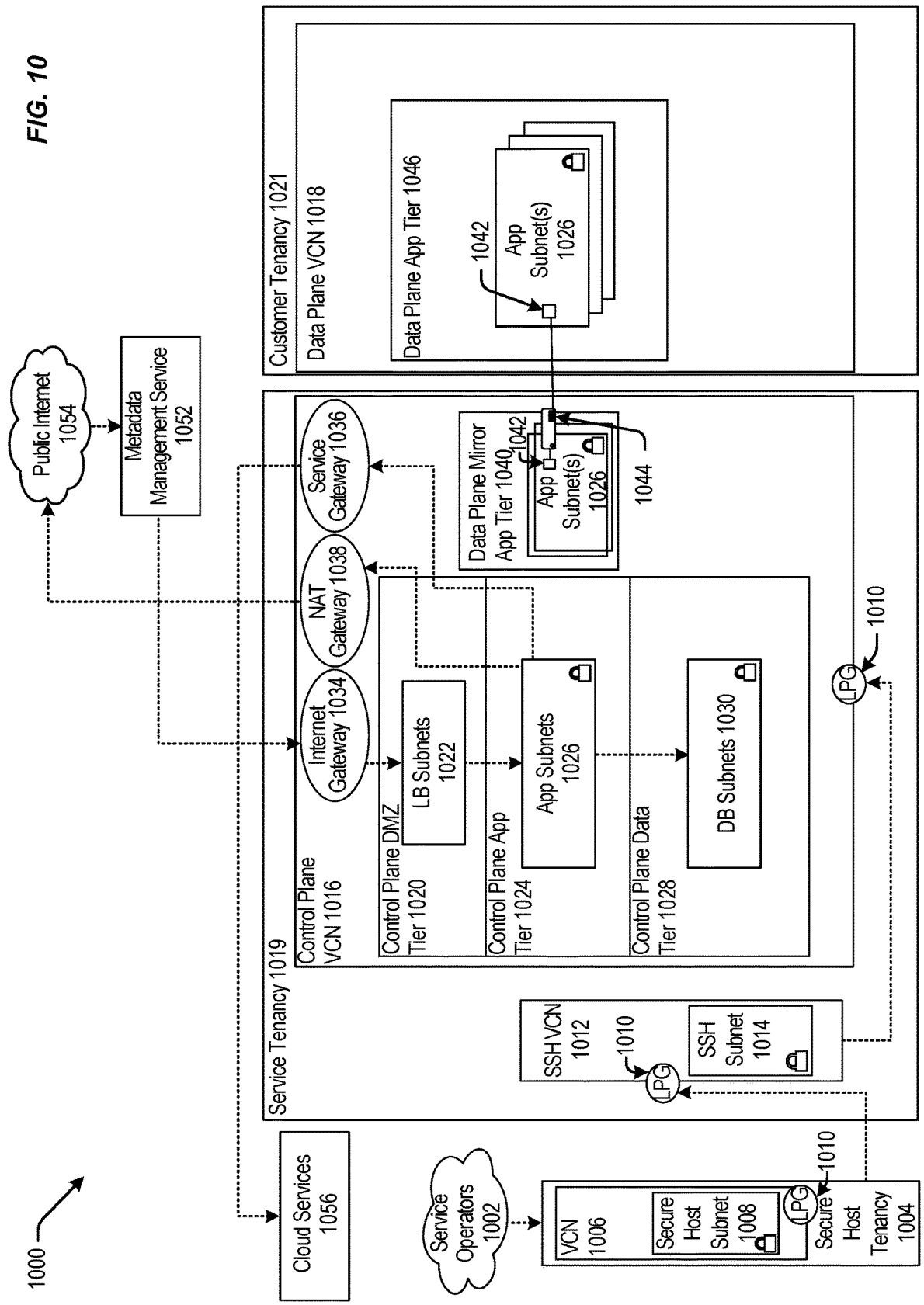
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
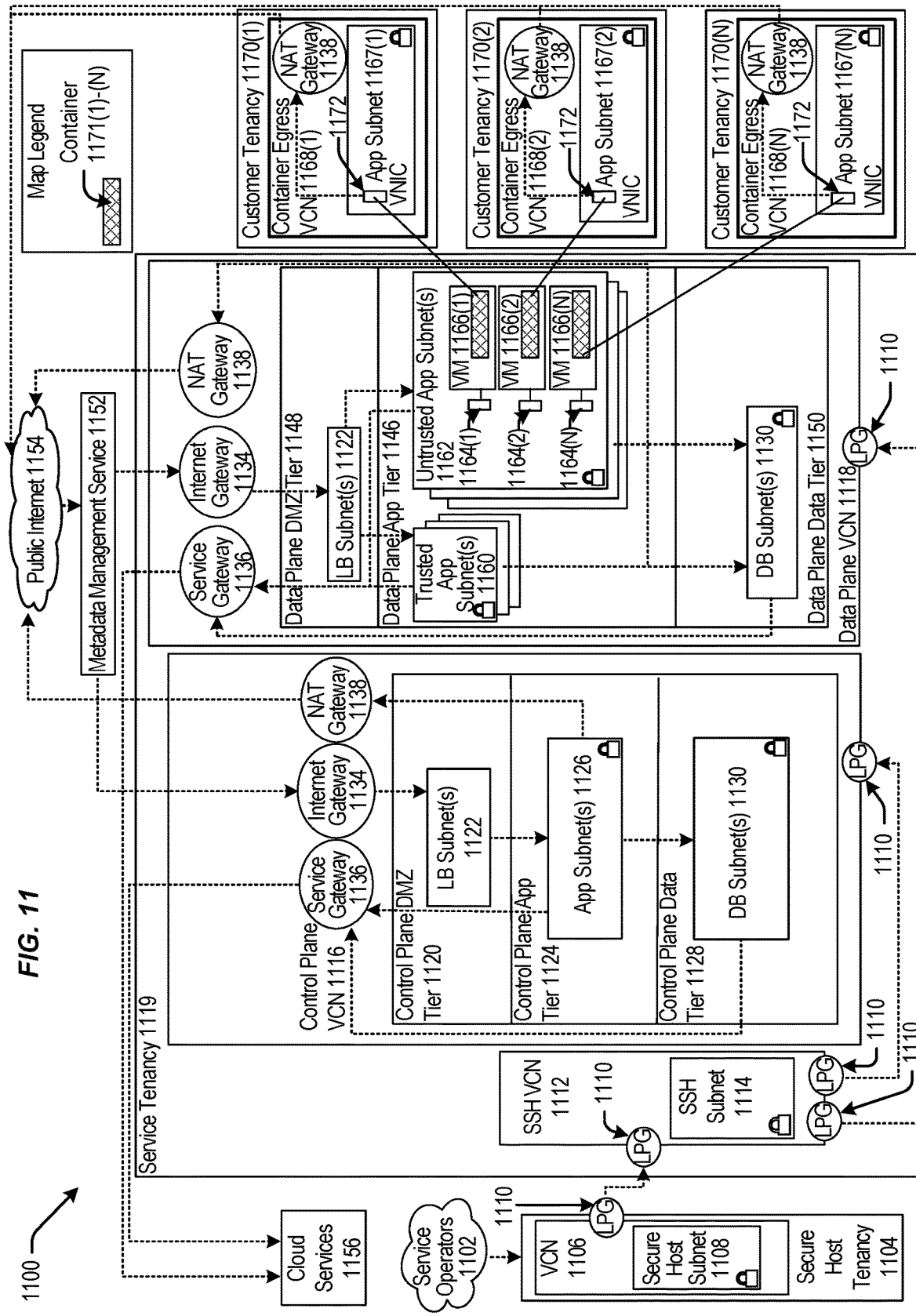
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane VCN 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
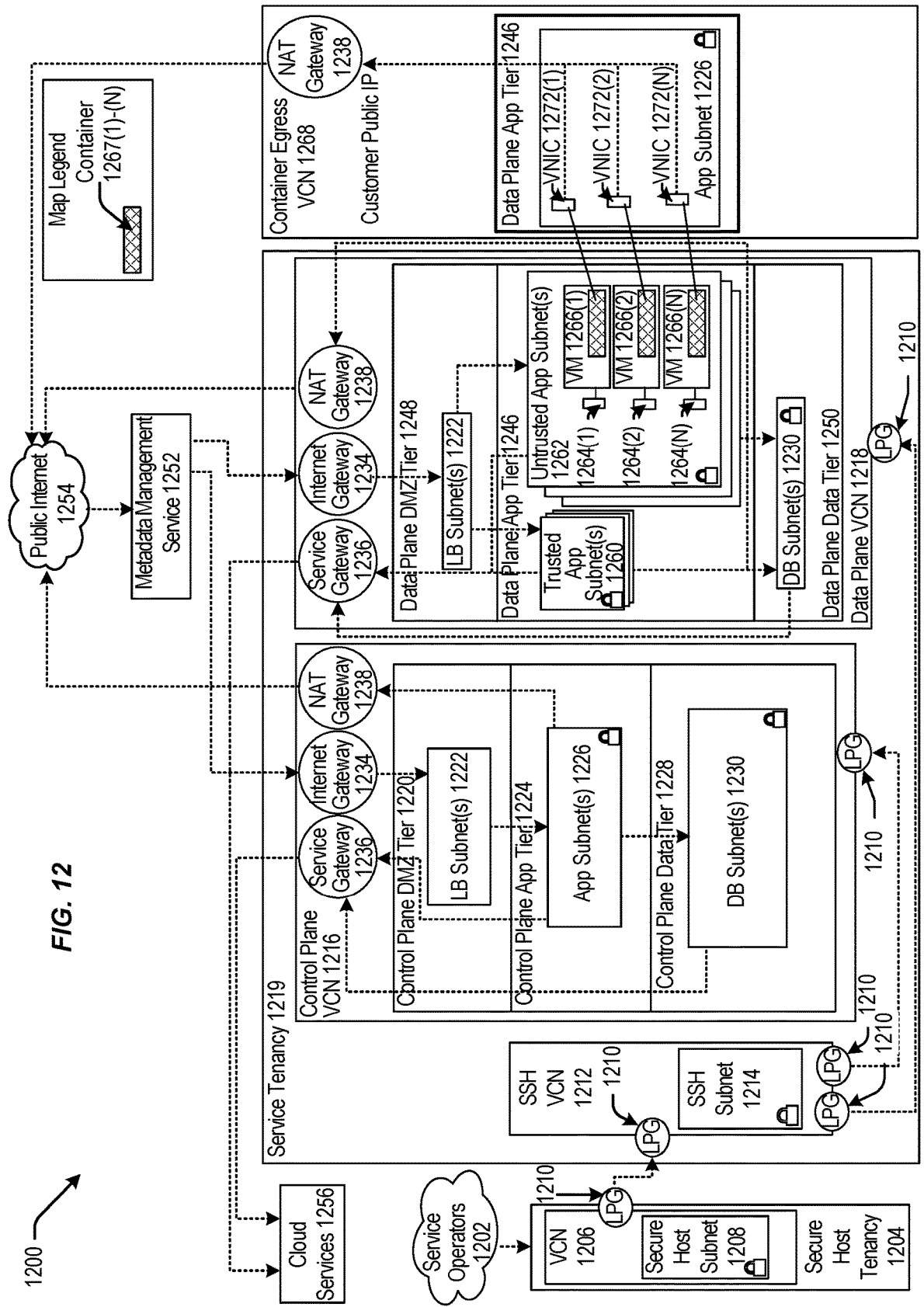
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane VCN 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s)

922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N) and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that the IaaS architectures depicted in diagrams 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
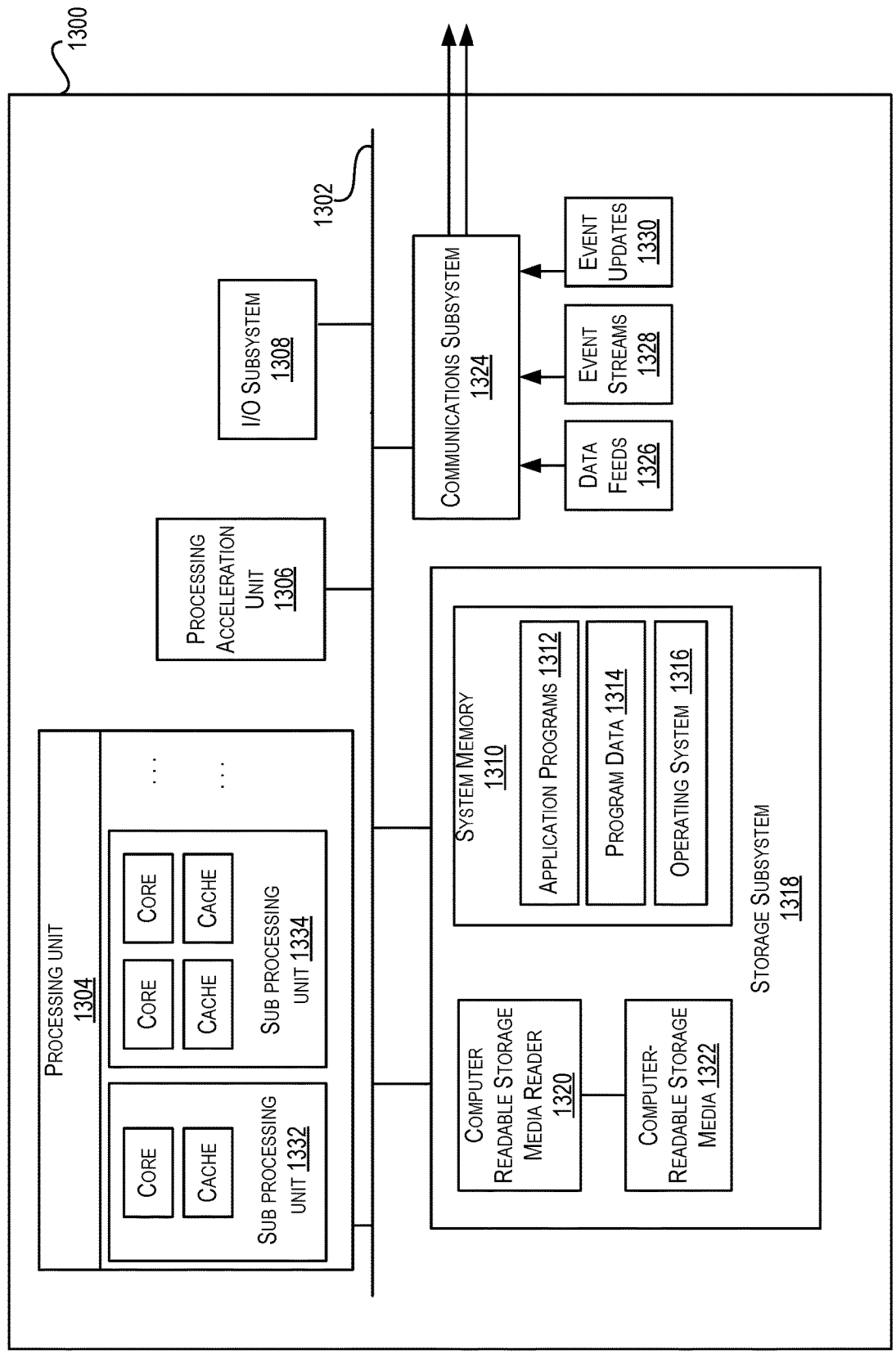
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1304 provide the functionality described above. Storage subsystem 1318 may also provide a repository for storing data used in accordance with the present disclosure.

As depicted in the example in FIG. 13, storage subsystem 1318 can include various components including a system memory 1310, computer-readable storage media 1322, and a computer readable storage media reader 1320. System memory 1310 may store program instructions that are loadable and executable by processing unit 1304. System memory 1310 may also store data that is used during the execution of the instructions and/or data that is generated during the execution of the program instructions. Various different kinds of programs may be loaded into system memory 1310 including but not limited to client applications, Web browsers, mid-tier applications, relational database management systems (RDBMS), virtual machines, containers, etc.

System memory 1310 may also store an operating system 1316. Examples of operating system 1316 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1300 executes one or more virtual machines, the virtual machines along with their guest operating systems (GOSs) may be loaded into system memory 1310 and executed by one or more processors or cores of processing unit 1304.

System memory 1310 can come in different configurations depending upon the type of computer system 1300. For example, system memory 1310 may be volatile memory (such as random-access memory (RAM)) and/or non-volatile memory (such as read-only memory (ROM), flash memory, etc.) Different types of RAM configurations may be provided including a static random-access memory (SRAM), a dynamic random-access memory (DRAM), and others. In some implementations, system memory 1310 may include a basic input/output system (BIOS) containing basic routines that help to transfer information between elements within computer system 1300, such as during start-up.

Computer-readable storage media 1322 may represent remote, local, fixed, and/or removable storage devices plus storage media for temporarily and/or more permanently containing, storing, computer-readable information for use by computer system 1300 including instructions executable by processing unit 1304 of computer system 1300.

Computer-readable storage media 1322 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magnetoresistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for computer system 1300.

Machine-readable instructions executable by one or more processors or cores of processing unit 1304 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
receiving, by a data lake security service associated with a data lake, a file system call comprising a uniform resource identifier and a credential, the data lake security service being configured to: 1) identify a relational database component stored within the data lake and corresponding to the file system call and 2) authorize access to the relational database component based at least in part on a relational security policy and the credential;
obtaining, by the data lake security service, relational database metadata corresponding to a plurality of relational database components;
identifying, by the data lake security service from the relational database metadata, the relational database component corresponding to the uniform resource identifier of the file system call;
authorizing, by the data lake security service, access to a storage location at which data associated with the relational database component is stored, the access being authorized based at least in part on the credential and the relational security policy corresponding to the relational database component; and
responsive to the file system call, providing, by the data lake security service, a pre-authenticated uniform resource locator corresponding to the storage location at which the data associated with the relational database component is stored within the data lake, the pre-authenticated uniform resource locator enabling subsequent access to the data to be granted by a data lake manager of the data lake irrespective of further evaluation of the relational security policy.

2. The computer-implemented method of claim 1, further comprising:
obtaining, by the data lake security service at start up, additional relational database metadata associated with the plurality of relational database components for which corresponding data is stored in the data lake;
obtaining a plurality of pre-authenticated uniform resource locators comprising a respective pre-authenticated uniform resource locator for each relational database component of the plurality of relational database components; and storing the plurality of pre-authenticated uniform resource locators for subsequent use.

3. The computer-implemented method of claim 2, further comprising updating the plurality of pre-authenticated uniform resource locators based at least in part on a predetermined frequency or schedule.

4. The computer-implemented method of claim 2, wherein the data lake security service is configured to perform operations comprising:
identifying, based at least in part on a predefined expiration rule, an expired pre-authenticated uniform resource locator of the plurality of pre-authenticated uniform resource locators;
obtaining a new pre-authenticated uniform resource locator associated with the relational database component corresponding to the expired pre-authenticated uniform resource locator;
storing the new pre-authenticated uniform resource locator in a cache; and
deleting, from the cache the expired pre-authenticated uniform resource locator.

5. The computer-implemented method of claim 1, further comprising generating, by the data lake security service, a mapping between the uniform resource identifier, the credential, the relational database component, and the pre-authenticated uniform resource locator.

6. The computer-implemented method of claim 5, wherein the mapping is stored in a trie data structure comprising a plurality of nodes, each node being associated with a respective uniform resource identifier.

7. The computer-implemented method of claim 1, wherein a subsequent access request to the data lake is granted based on whether the subsequent access request comprises the pre-authenticated uniform resource locator, irrespective of further relational security policy processing.

8. The computer-implemented method of claim 1, further comprising generating a hash of the pre-authenticated uniform resource locator prior to providing the pre-authenticated uniform resource locator, wherein the pre-authenticated uniform resource locator provided comprises the hash, and wherein a client library executing at a relational data engine received the hash and reconstructs the pre-authenticated uniform resource locator from the hash.

9. The computer-implemented method of claim 1, further comprising authenticating a requestor associated with the file system call with an identity management service based at least in part on the credential.

10. The computer-implemented method of claim 1, wherein the relational database metadata is received from a metadata store service that manages corresponding relational database metadata for a relational database that is stored in the data lake.

11. The computer-implemented method of claim 1, wherein the credential is evaluated based at least in part on the relational security policy, and wherein the relational security policy relates to a column level relational database component or a row level relational database component.

12. A non-transitory computer readable medium, storing computer-executable instructions that, when executed by one or more processors of a data lake security service associated with a data lake, cause the data lake security service to:
receive a file system call comprising a uniform resource identifier and a credential, the data lake security service being configured to: 1) identify a relational database component stored within the data lake and corresponding to the file system call and 2) authorize access to the relational database component based at least in part on a relational security policy and the credential;
obtain relational database metadata corresponding to a plurality of relational database components;
identify, from the relational database metadata, the relational database component corresponding to the uniform resource identifier of the file system call;
authorize access to a storage location at which data associated with the relational database component is stored, the access being authorized based at least in part on the credential and the relational security policy corresponding to the relational database component; and
responsive to the file system call, provide a pre-authenticated uniform resource locator corresponding to the storage location at which the data associated with the relational database component is stored within the data lake, the pre-authenticated uniform resource locator enabling subsequent access to the data to be granted by a data lake manager of the data lake irrespective of further evaluation of the relational security policy.

13. The non-transitory computer readable medium of claim 12, wherein the data lake stores the data associated with the relational database component in an open format.

14. The non-transitory computer readable medium of claim 12, wherein the file system call is received from a client library of a client device, the client library intercepting the file system call from a relational database engine configured to access the data lake and transmitting the file system call to the data lake security service.

15. The non-transitory computer readable medium of claim 14, wherein executing the executable instructions further causes the data lake security service to:
generate the pre-authenticated uniform resource locator for accessing the data associated with the relational database component; and
provide the pre-authenticated uniform resource locator to the client library, the client library transmitting, to the data lake manager associated with the data lake, a request to access the data associated with the relational database component, the request comprising the pre-authenticated uniform resource locator.

16. A non-transitory computer readable medium storing computer-executable instructions that, when executed by one or more processors of a computing device, cause the computing device to:
transmit, to a data lake security service, a file system call comprising a uniform resource identifier and a credential, the data lake security service being configured to: 1) identify, from relational database metadata corresponding to a plurality of relational database components, a relational database component stored within a data lake and corresponding to the file system call and the uniform resource identifier and 2) authorize access to the relational database component based at least in part on a relational security policy and the credential;
receive, from the data lake security service, a pre-authenticated uniform resource locator corresponding to the relational database component stored within the data lake;
transmit, to a data lake manager of the data lake, a request for data corresponding to the relational database component, the request comprising the pre-authenticated uniform resource locator, the data lake manager being configured to restrict access to the data lake in accordance with a plurality of relational security policies corresponding to respective relational database components of the plurality of relational database components, the pre-authenticated uniform resource locator enabling access to the data to be granted by the data lake manager irrespective of further evaluation of the plurality of relational security policies; and responsive to the request, receive, from the data lake manager, the data corresponding to the relational database component stored within the data lake.

17. The non-transitory computer readable medium of claim 16, wherein the file system call is initiated by a data engine executed at the computing device and intercepted by a client library executing at the computing device, the client library causing the files system call to be transmitted to the data lake security service.

18. The non-transitory computer readable medium of claim 16, wherein executing the computer-executable instructions further causes the computing device to store an association between the uniform resource identifier and the request comprising the pre-authenticated uniform resource locator and corresponding to the relational database component in a cache for subsequent access requests.

19. The non-transitory computer readable medium of claim 18, wherein executing the computer-executable instructions further causes the computing device to:
 receive a subsequent access request comprising the uniform resource identifier and the credential;
 identify, from the cache and based on the uniform resource identifier, the request comprising the pre-authenticated uniform resource locator corresponding to the relational database component; and
 transmit, to the data lake manager of the data lake, a second request for the data corresponding to the relational database component, the second request comprising the pre-authenticated uniform resource locator identified from the cache.

* * * * *